United States Patent [19]

Nadir

[11] 4,257,095

[45] Mar. 17, 1981

[54] SYSTEM BUS ARBITRATION, CIRCUITRY AND METHODOLOGY

[75] Inventor: James Nadir, Sunnyvale, Calif.

[73] Assignee: Intel Corporation, Santa Clara, Calif.

[21] Appl. No.: 921,083

[22] Filed: Jun. 30, 1978

[51] Int. Cl.³ .............................................. G06F 3/00
[52] U.S. Cl. ................................................. 364/200
[58] Field of Search ........ 364/200, 900, 200 MS File, 364/900 MS File

[56] References Cited

U.S. PATENT DOCUMENTS

| | | | |
|---|---|---|---|
| 3,825,902 | 7/1974 | Brown et al. | 364/200 |
| 3,983,540 | 9/1976 | Keller et al. | 364/200 |
| 3,995,258 | 11/1976 | Barlow | 364/200 |
| 4,040,028 | 8/1977 | Pauker et al. | 364/200 |
| 4,148,011 | 4/1979 | McLagan et al. | 364/900 X |
| 4,181,974 | 1/1980 | Lemay et al. | 364/900 |

*Primary Examiner*—James D. Thomas
*Assistant Examiner*—Thomas M. Heckler
*Attorney, Agent, or Firm*—Blakely, Sokoloff, Taylor & Zafman

[57] ABSTRACT

Arbitration of a system bus shared by a plurality of digital processors, input and output devices and memories may be shared in an intelligent and efficient manner by using an arbitration method and an arbiter and bus controller circuit which allows a lower priority processor or user to access the system bus during those times in which a higher priority user of the system bus is not actively accessing the system bus. Thus, without altering the priority assignments among multiple users of a system bus, lower priority users requesting access may be allowed selective and limited access to the system bus during those times in which a higher priority user is in either an idle or halt state or is engaged in utilizing another bus, such as an input/output bus or resident bus.

21 Claims, 20 Drawing Figures

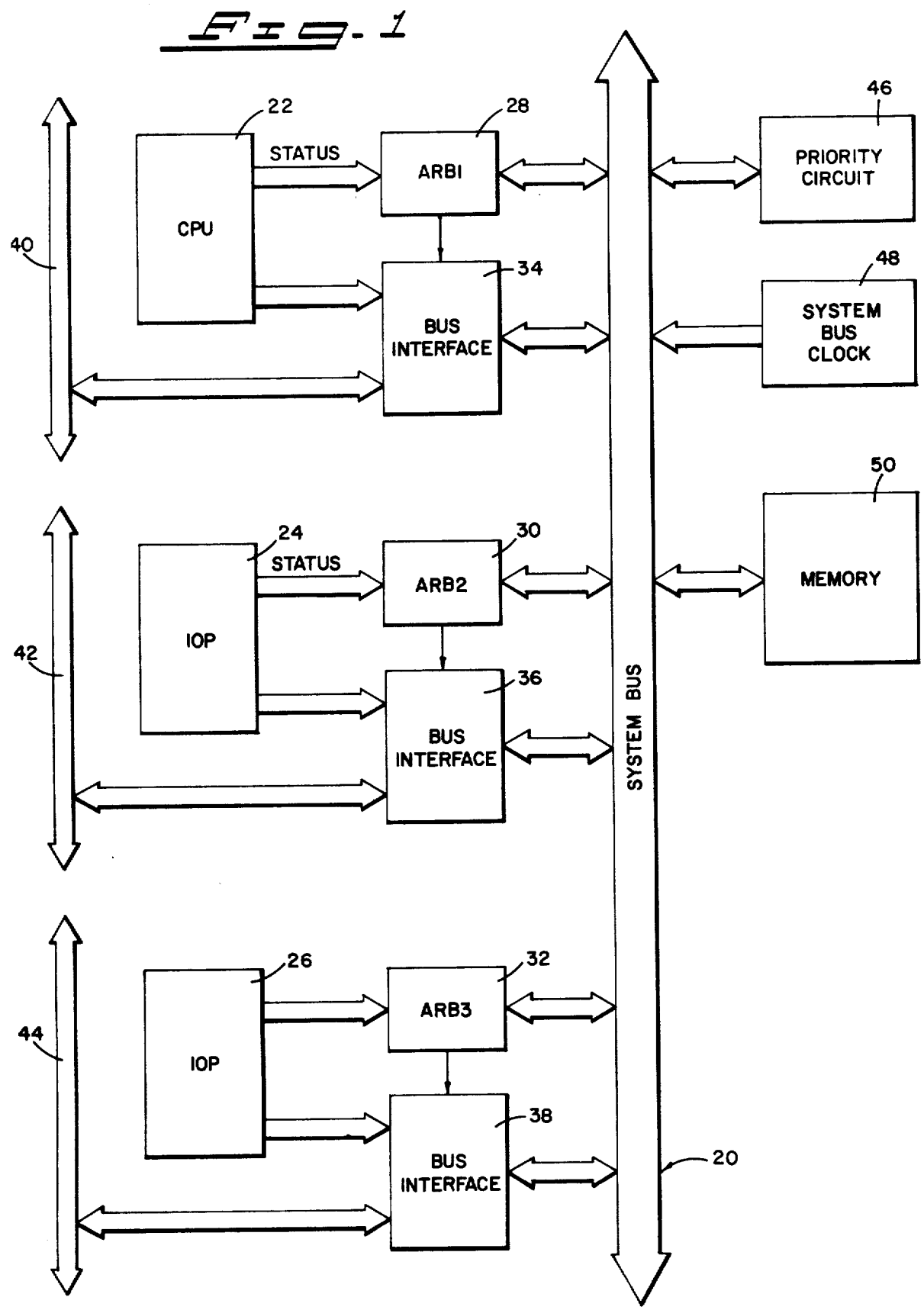

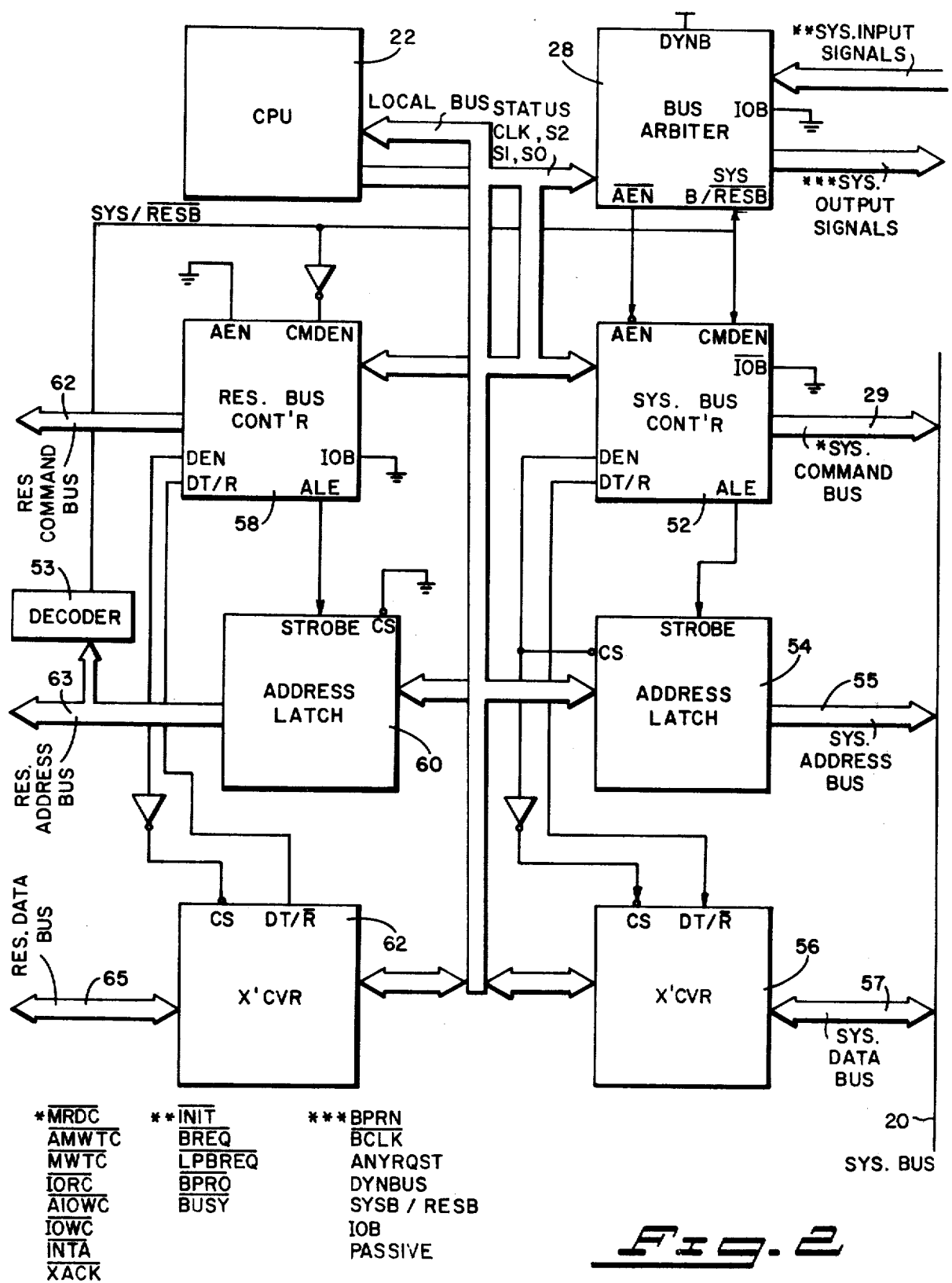

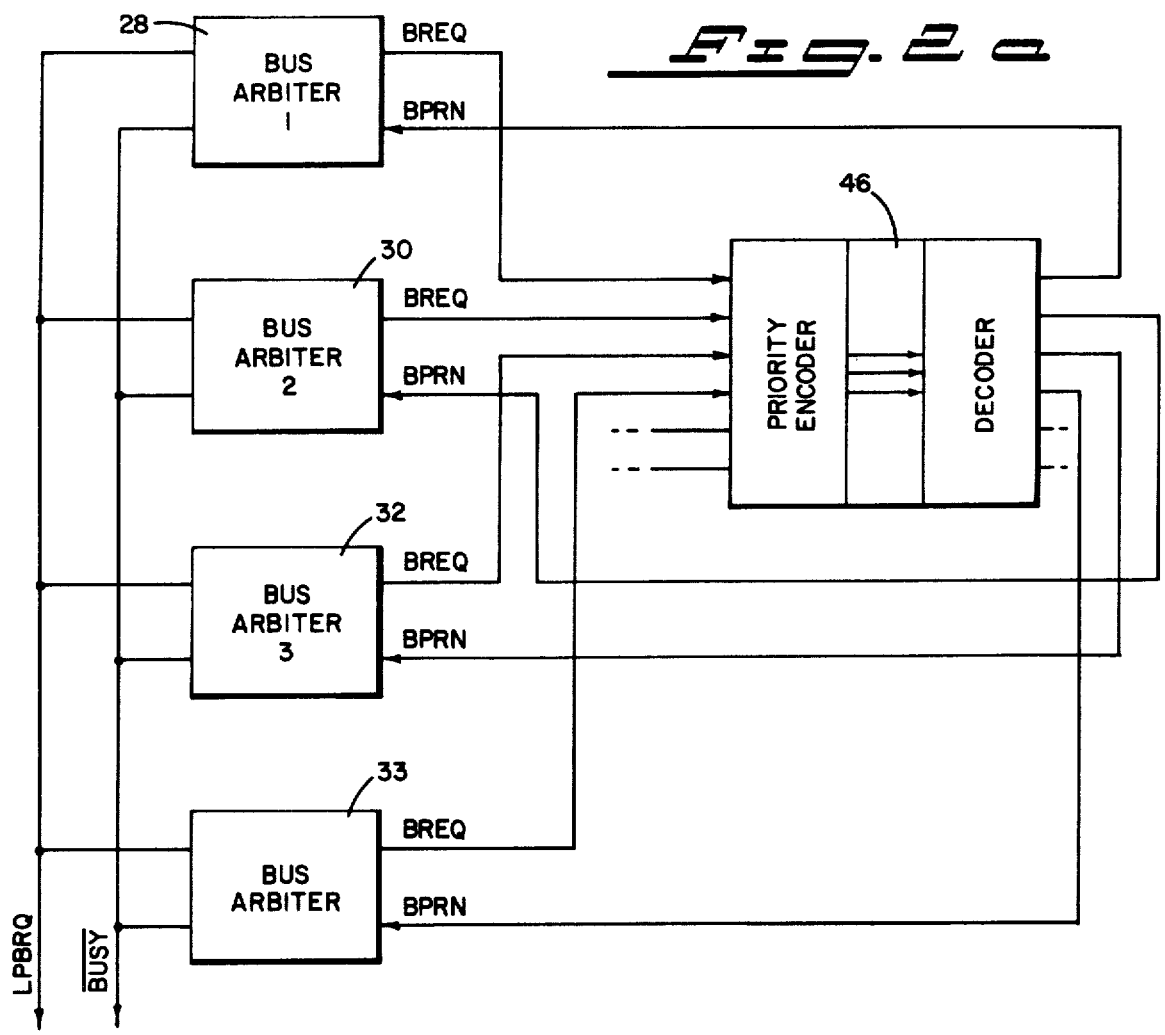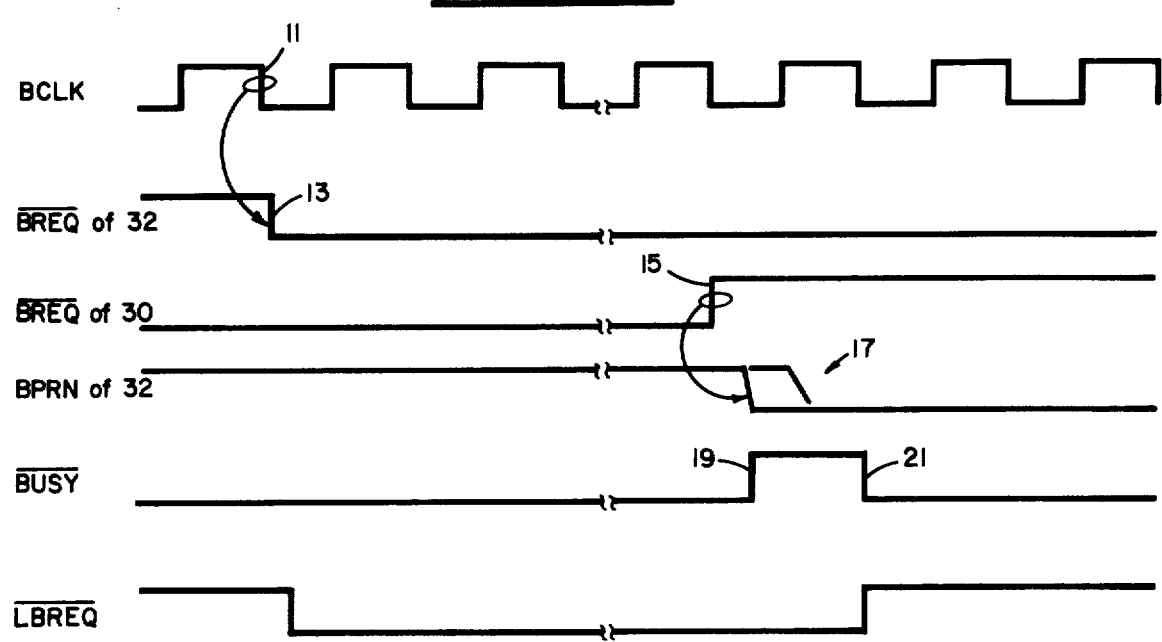

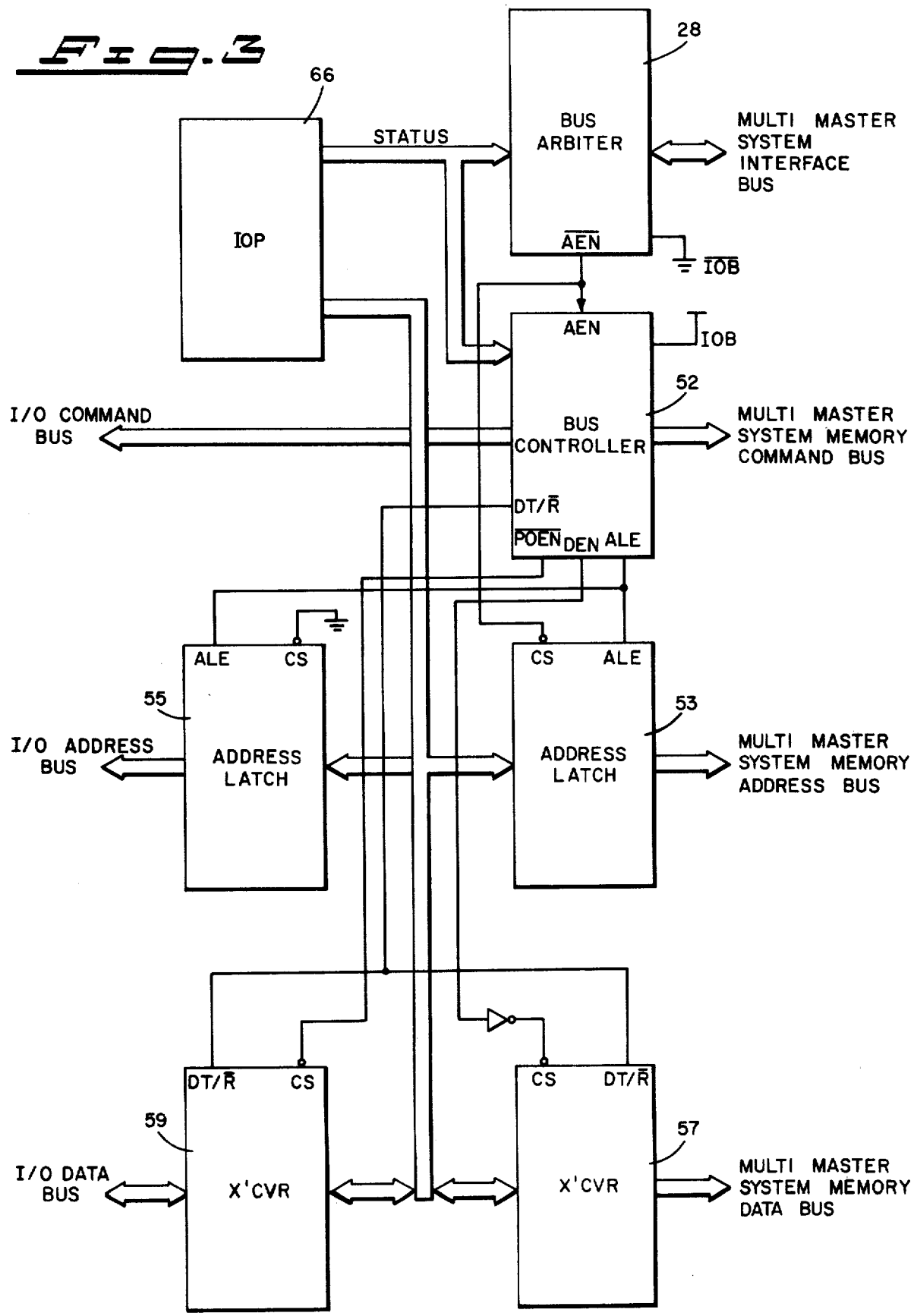

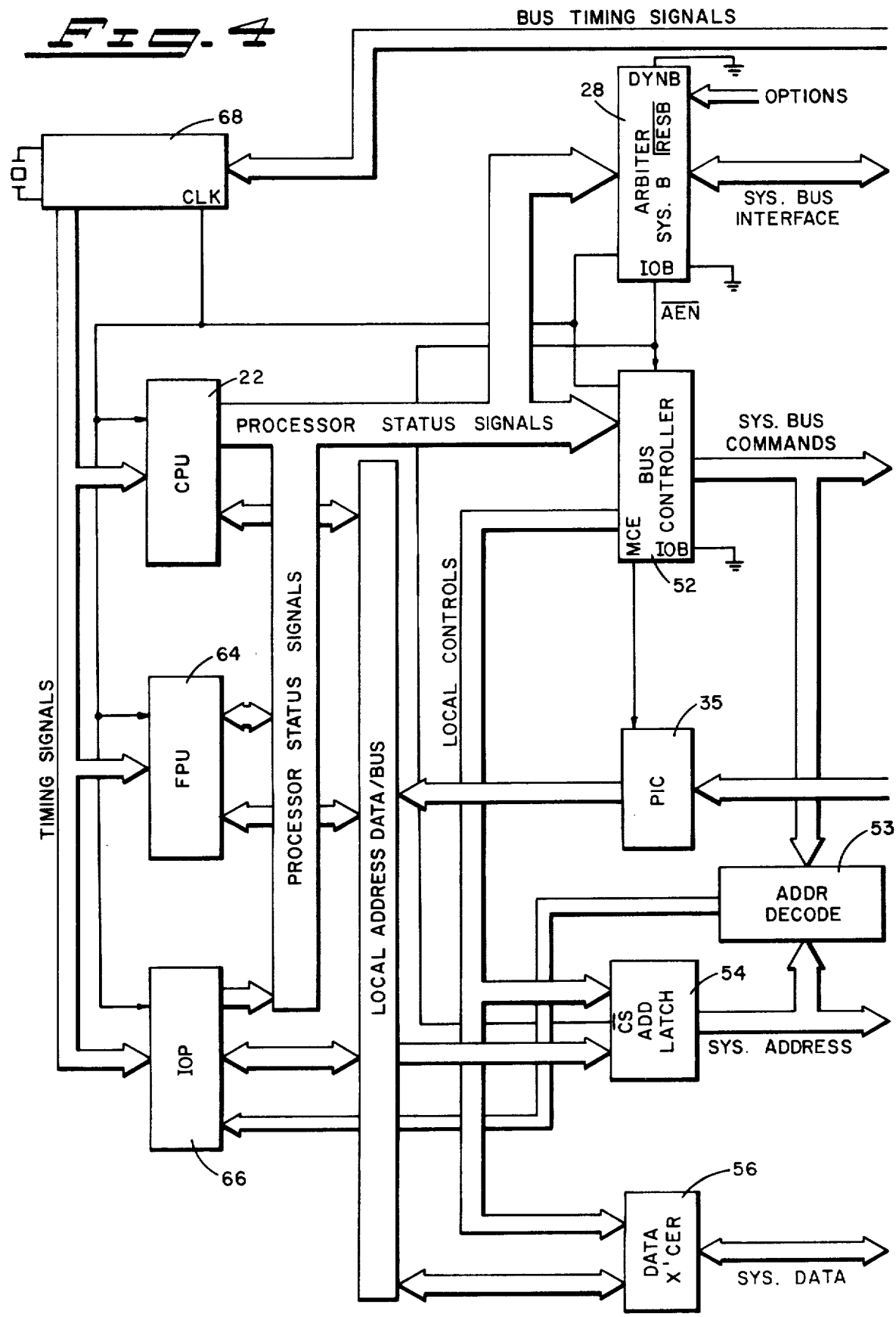

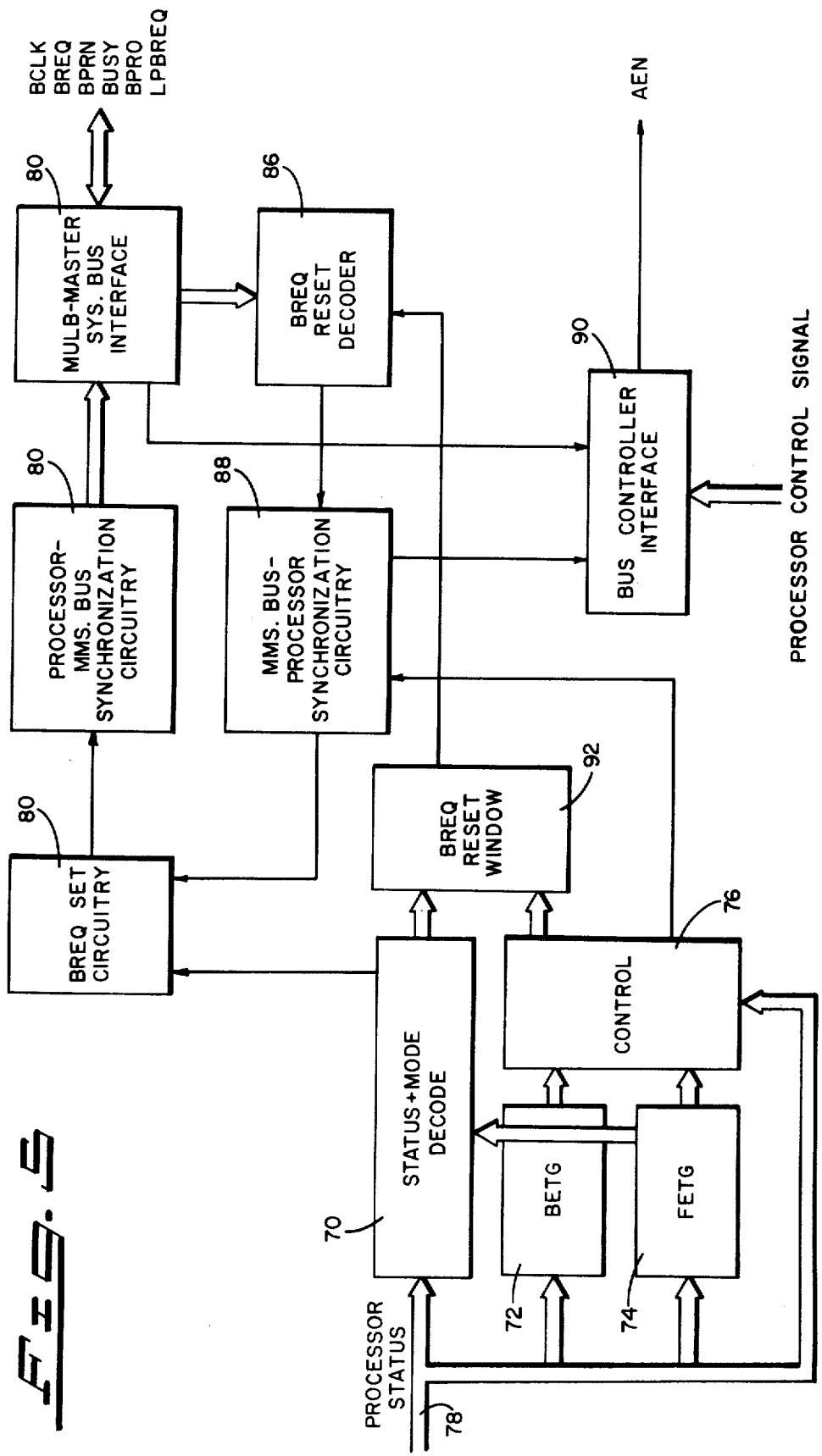

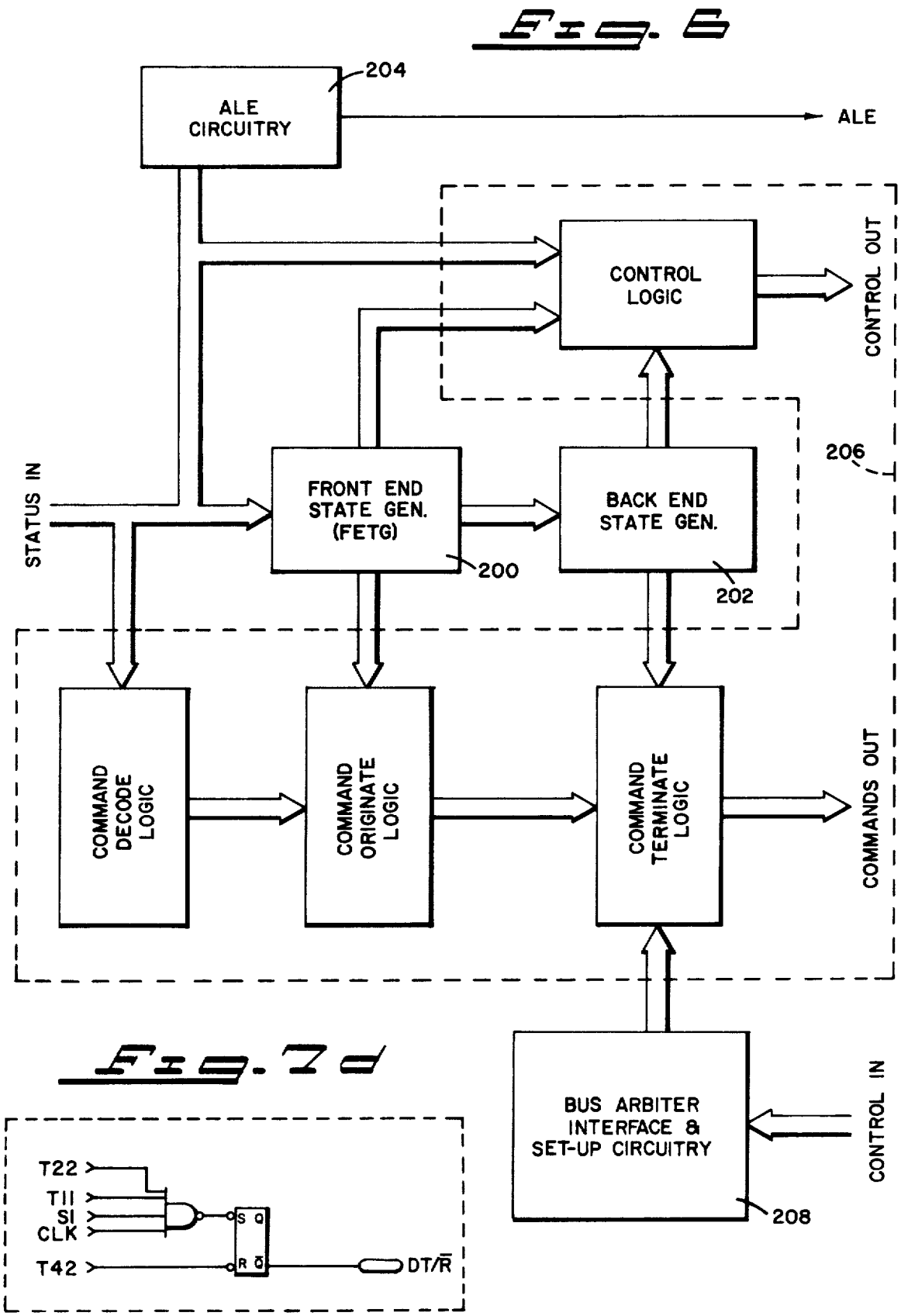

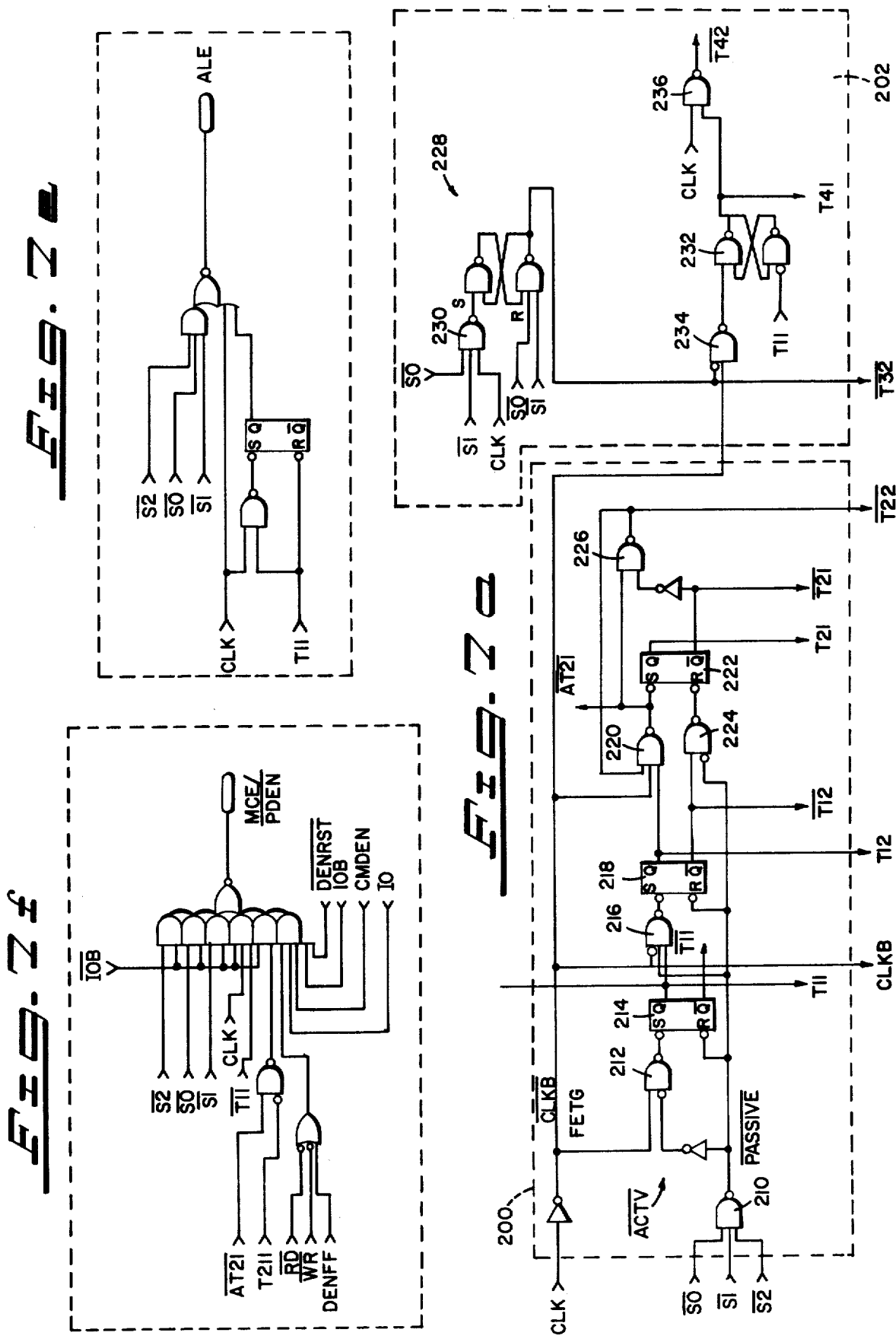

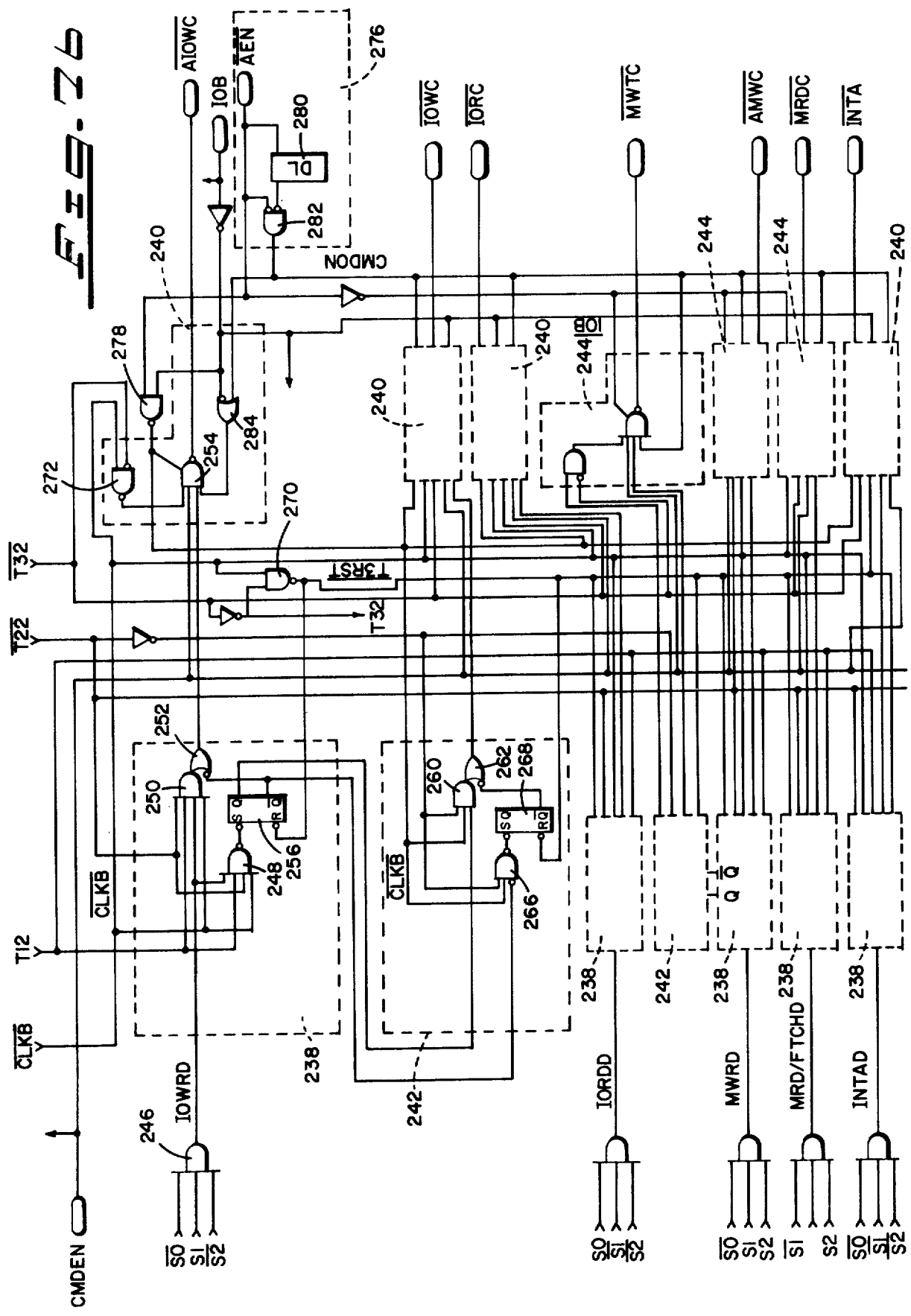

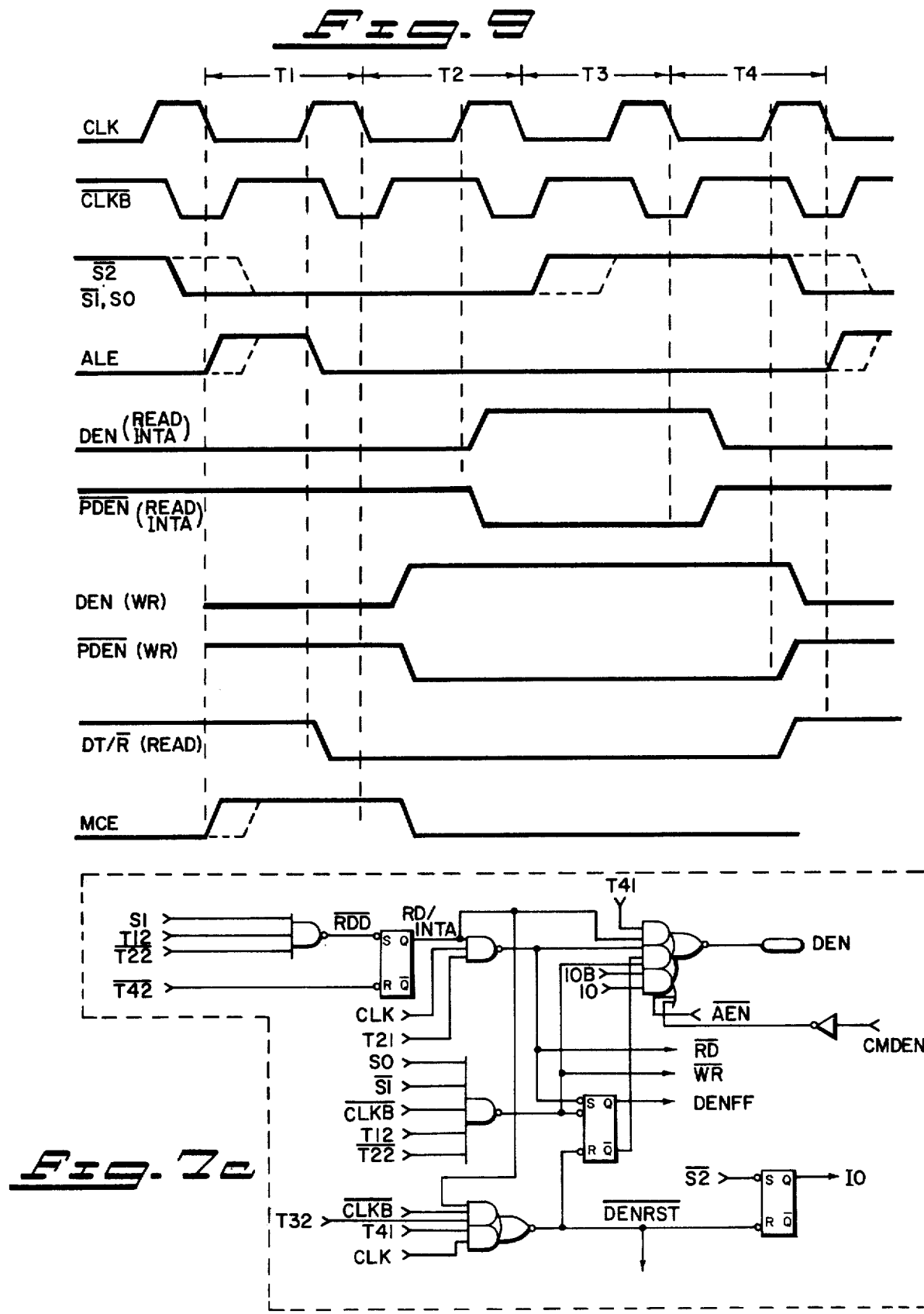

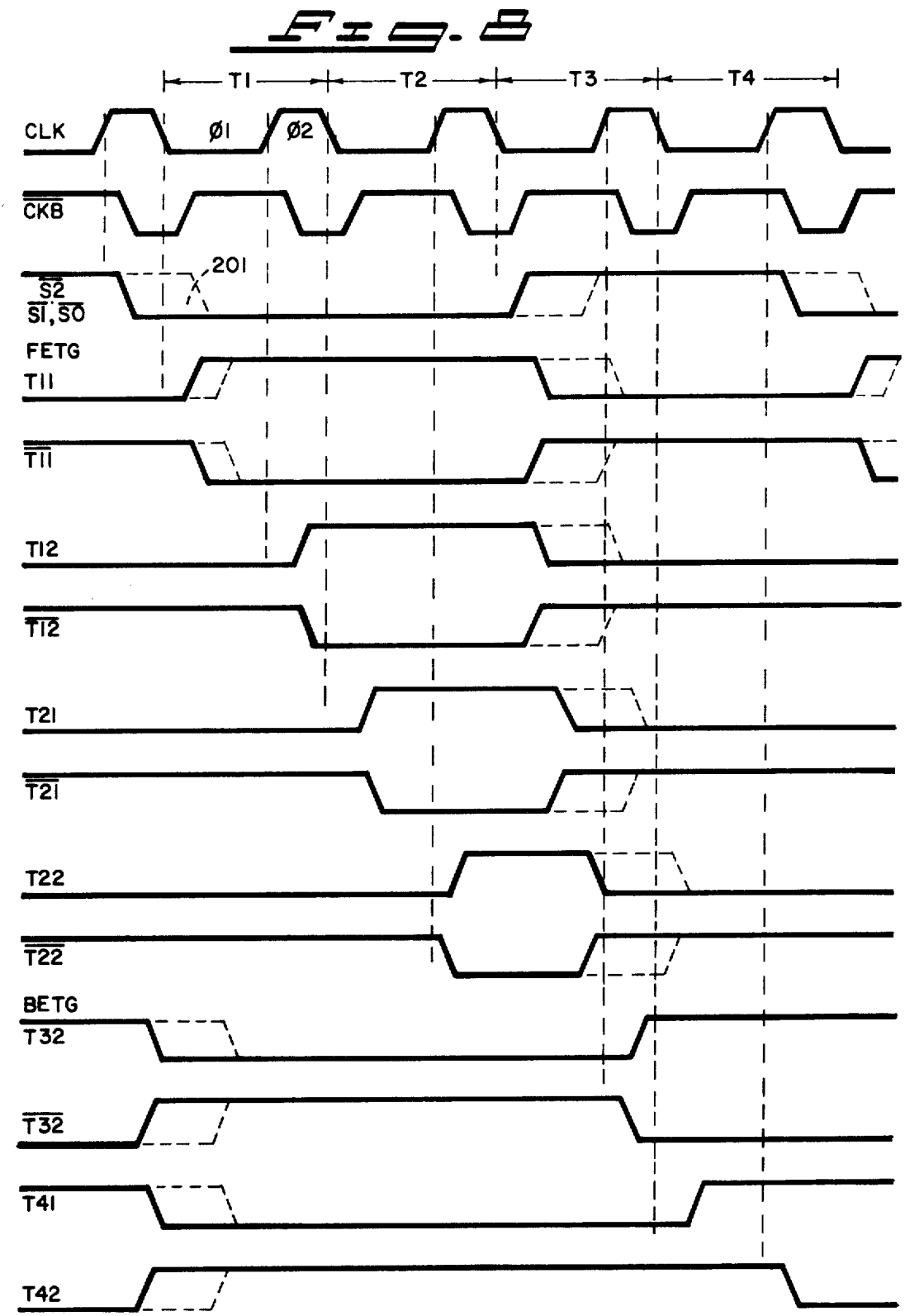

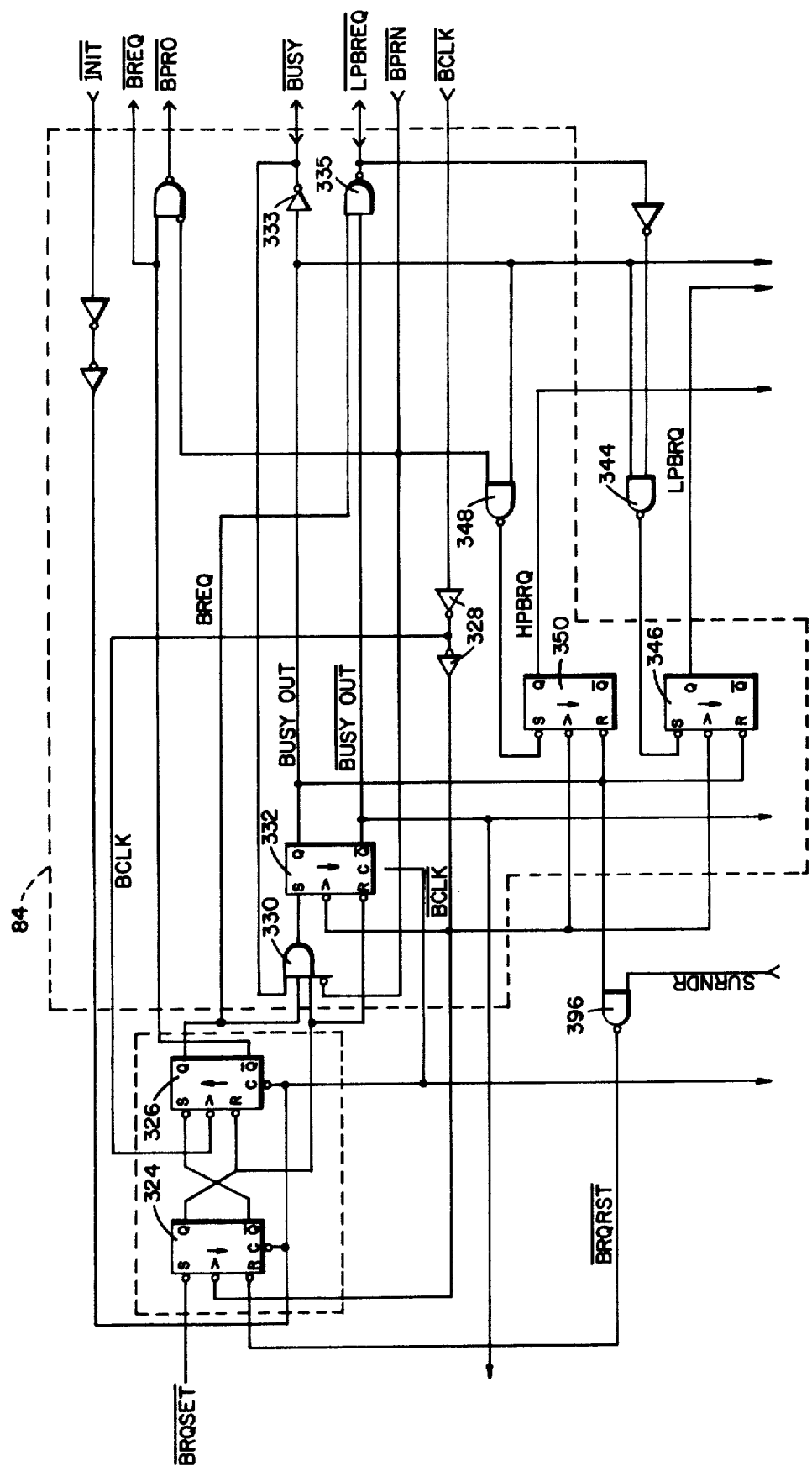

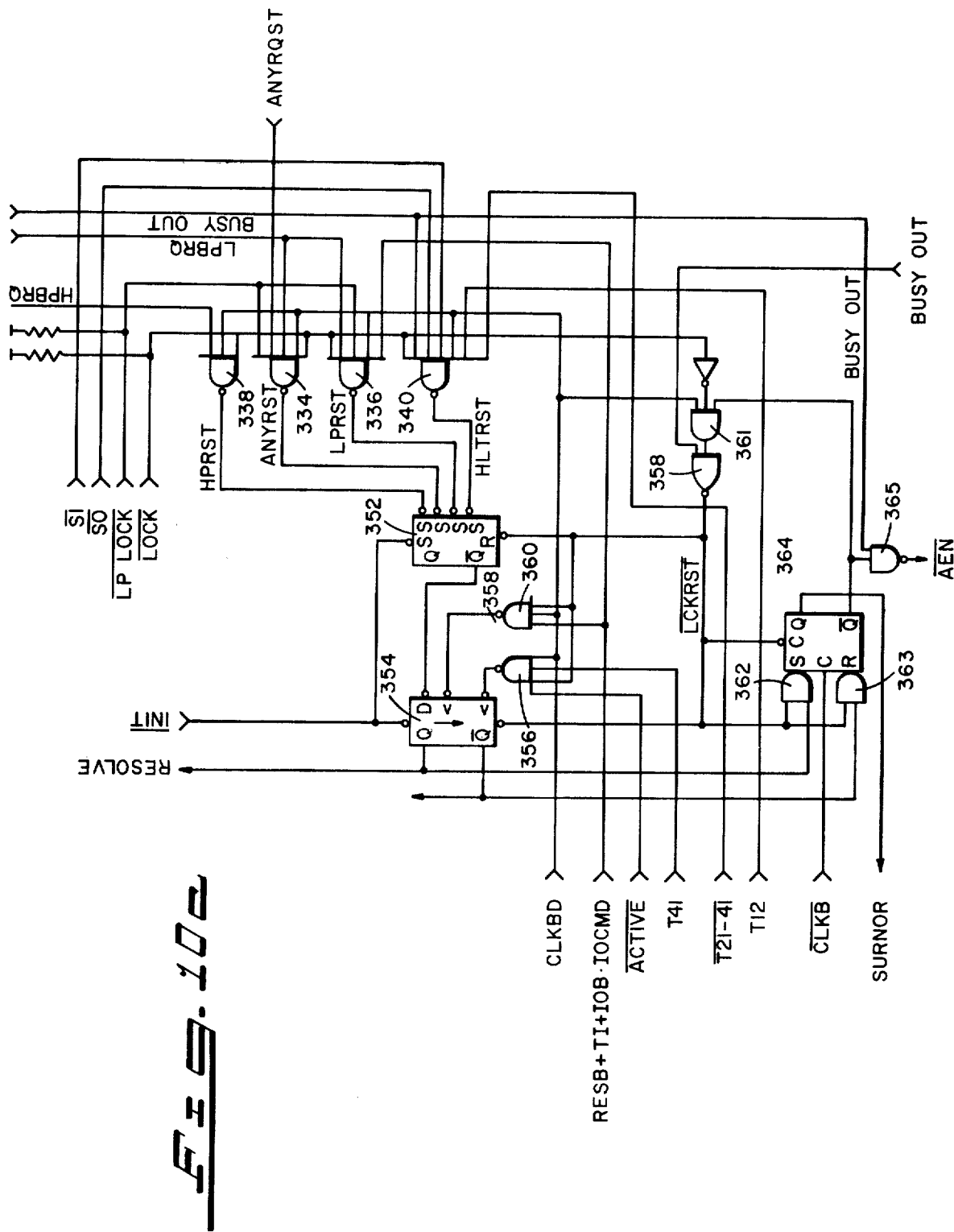

SYSTEM BUS ARBITRATION, CIRCUITRY AND METHODOLOGY

BACKGROUND OF THE INVENTION

1. Field of the Invention

The present invention relates to the methodologies and circuitry for arbitrating the use of a system bus in an integrated circuit multimaster digital system, and in particular relates to system bus arbiters and controllers dealing with an assigned priority or hierarchy of users.

2. Description of the Prior Art

The typical prior art microprocessor system was comprised of a microprocessor coupled to a control, address and data bus to which was coupled an addressable memory in an input/output device. The single microprocessor controlled all activity on the control, address and data bus and was the single master of the memory and input/output device. With the advent of accelerating price reductions in microprocessors the memory and input/output components became the most expensive components of the digital system. Therefore, higher order digital systems with greater capacities and complexities could be organized by coupling multiple central processors to a single control, address and data bus which shared common memory and input/output peripherals. However, in order to share the memory and input/output peripherals some means was required to resolve priority conflicts between among the multiple central processors. This entailed the addition of a priority resolving circuit which was coupled to the multiple central processing units by an arbitrating control bus having a plurality of bus request and status signals. A typical priority resolving circuit contained the entire logic for arbitration of the control, address and data bus among the multiple central processing units. Generally, the concentration of the arbitration circuit within a single priority resolving module entailed limitations both upon the practical complexity of the arbitration scheme as well as the number of central processing units which could be included within the system.

These prior art digital systems have been increasingly organized and configured about a multimaster bus. In other words, a single system bus will be shared by a number of intelligent processing units or bus masters, some of which may be general central processors and some of which may be specialized or dedicated processors, such as an input/output processor (IOP).

A bus master, such as a processor or a direct memory accessing circuit, is defined as a circuit which is capable of controlling an associated bus. Thus, a local bus master is a circuit which may control a local bus, and a system bus master is one which controls a system bus. The system bus is that bus through which a plurality of bus masters, usually intelligent processing circuits, share a common memory and input/output devices. A local bus is that bus through which one or more circuits or a processor's family may communicate with a plurality of dedicated circuits, including dedicated memories and input/output devices. Thus, by decentralizing the intelligence or decision making capability of the digital system among separate processors coupled to a common system bus, information may be manipulated and transferred in a plurality of overlapping or time-shared sequences to achieve highly sophisticated circuit operations at low unit pricing by sharing the costly common peripherals such as memory and input/output devices.

Therefore, some means must be devised for coordinating the access of the plurality of users to the shared system bus. Prior art bus arbitration has been based upon the concept that at any given time only one bus master or user will have priority over all the other masters or users coupled to the system bus. Such "one master at a time" schemes have used parallel priority resolving techniques, serial priority resolving techniques, and rotating priority resolving techniques.

The parallel priority resolving technique provides for a separate bus request line for each arbiter circuit coupled to the multimaster system bus. Each bus request line is coupled to a priority encoder which generates the priority address of the highest priority bus request line which is then active. The binary address is decoded by a decoder to select the corresponding bus priority request line (BPRN), which goes active to designate the highest priority requesting arbiter. The arbiter receiving this priority bus request signal then couples its associated local bus master to the multimaster system bus as soon as the system bus becomes available. When one bus arbiter gains priority over another arbiter, it cannot immediately seize the bus, but must wait until the present bus user completes its transfer cycle. Upon completing the transfer cycle, the present bus user recognizes that it no longer has priority and then surrenders the bus to the higher priority user. Once the higher priority user controls the bus, all other lower priority users are kept off.

The serial priority revolving technique eliminates the need for a priority encoder and decoder arrangement by combining the bus arbiters into a daisy chain organization. The higher priority bus arbiter's bus priority output terminal is coupled to the bus priority input terminal of the lower priority arbiter. Thus, the hierarchy of priorities is serially shifted downward as long as the higher priority arbiter is not then requesting access to the system bus.

The rotating priority revolving technique employs complex logic circuitry which rotates the priority assignments among the plurality of users such that each user, at some given time, is treated as the highest priority user.

Each of the prior art arbitration methodologies and circuitries are subject to disadvantages and inefficiencies in the use of the system bus. The rotating priority resolving technique requires ever increasing degrees of complexity as the number of users of the system bus increases. The serial priority bus arbiter is limited to a restricted number of users as determined by the comparative duration of the cumulative daisy chain propagation delays with respect to the duration of the system bus clock. The parallel priority resolving technique is subject to the defect that the system bus is captured by the highest priority user then active, keeping all other users off the system bus even during those times where the highest priority user is momentarily accessing another bus or has entered an idle state.

The present invention provides for a methodology and circuitry for bus arbitration which overcomes bus inefficiencies of the prior art priority resolving techniques.

BRIEF SUMMARY OF THE INVENTION

The present invention is an arbitration and controlling circuit having an assigned priority with respect to a system bus. A processing circuit is used for transferring digital information to and from the system bus. The arbitration circuit comprises a first means or circuit for detecting the status and mode of operation of the processing circuit. A second means or circuit is employed to request and obtain control of the system bus and respond to the output of the first means. The first and second means are coupled together while the second means is coupled to the system bus. A third means or circuit selectively surrenders control of the system bus to both lower and higher priority requests than that assigned to arbitration circuit. As a result of this combination, the system bus may be intelligently utilized to a maximum efficiency by allowing a lower priority circuit to access the system bus without altering the assigned priority. In other words, a lower priority circuit may obtain access to the bus while a higher priority circuit is momentarily engaged in accessing a bus other than the system bus, or is in an idle state.

The present invention also includes a methodology for arbitrating the use of a system bus wherein the system bus has a plurality of circuits coupled thereto for transferring digital information to and from the system bus. The plurality of circuits have an assigned priority of access to the system bus. The method comprises the steps of detecting the status and mode of operation of one of the plurality of circuits for transferring digital information, i.e., such as a central processor. Control of the system bus is requested and obtained in response to the status and mode of operation of this one circuit. Control of the system is then selectively surrendered to another one of the plurality circuits for transferring digital information. These other circuits are a plurality of circuits having both higher and lower priority assignments than that assigned to the circuit which has requested and previously obtained control of the system bus. Control of the system bus is selectively surrendered to the lower priority circuits during the time in which the circuit, which has control of the system bus, maintains its priority thereover but during such time when the controlling circuit is not accessing the system bus. In other words, during the time in which the controlling circuit is momentarily addressing a resident or input-output bus or is in an idle mode, a lower priority circuit may temporarily gain control over the system bus. As a result of this method the system bus is intelligently utilized to maximum efficiency by allowing a lower priority circuit access to the system bus without altering the assignment of priority among the plurality of circuits.

The present invention is an organization of microprocessors which affords and allows efficient access of multiple microprocessors to a multimaster bus. The advantages of the circuitry and methodology of the present invention is that a multiple of microprocessors or central processors may selectively access more than one bus; a multiple of other masters are able to obtain access and control to a single bus when priority is actually granted to a higher priority master which is in a nonaccessing mode; and the overhead time during which the bus is not actively utilized for transfer of digital information is reduced by providing a protocol wherein the bus in not released at the end of each transfer cycle. In other words, a multiple of transfer cycles are consecutively performed on a multimaster bus by a single master without the need or performance of a request and release cycle intevening between each transfer cycle. By reason of the present invention, multiple central processors or microprocessors may selectively be granted access and control to shared combinations of an input/output bus and system bus, to a shared resident bus and system bus, to a single shared system bus, or to a multiple of shared system busses each of which may in turn be associated with one or more input/output resident busses.

These and other advantages of the present invention may be better understood by considering the Detailed Description of the Preferred Embodiments in light of the following drawings.

BRIEF DESCRIPTION OF THE DRAWINGS

FIG. 1 is a simplified schematic showing three arbiters in combination with corresponding processors coupled between a resident, I/O bus and system bus;

FIG. 2 is a simplified block diagram of one processor with an arbiter showing the combination of the arbiter with a processor, and bus controller as coupled to a peripheral, resident and system bus;

FIG. 2a is a simplified block diagram showing a priority circuit communicating with a plurality of arbiters according to the present invention;

FIG. 2b is a simplified timing diagram illustrating the use of BUSY and LPBREQ signals in the arbitration protocol;

FIG. 3 is a simplified block diagram showing an arbiter and bus controller of the present invention configured to access a system bus and I/O bus;

FIG. 4 is a somewhat more detailed block diagram showing the coupling of three processors through an arbiter and bus controller to a multimaster system bus;

FIG. 5 is a block diagram of the arbiter of the present invention;

FIG. 6 is a block diagram of a bus controller of the present invention;

FIGS. 7a through 7f are schematic diagrams showing the logic circuitry of the bus controller illustrated in FIG. 6;

FIG. 8 is a timing diagram showing the relationship of many internal timing signals in the circuit of FIGS. 7a through 7f;

FIG. 9 is a timing diagram showing the relationship of several input and output signals of the circuit of FIGS. 7a through 7f;

FIGS. 10a through 10c are schematic diagrams of the arbiter circuit of FIG. 5.

DETAILED DESCRIPTION OF THE PREFERRED EMBODIMENTS

Figure 10A:
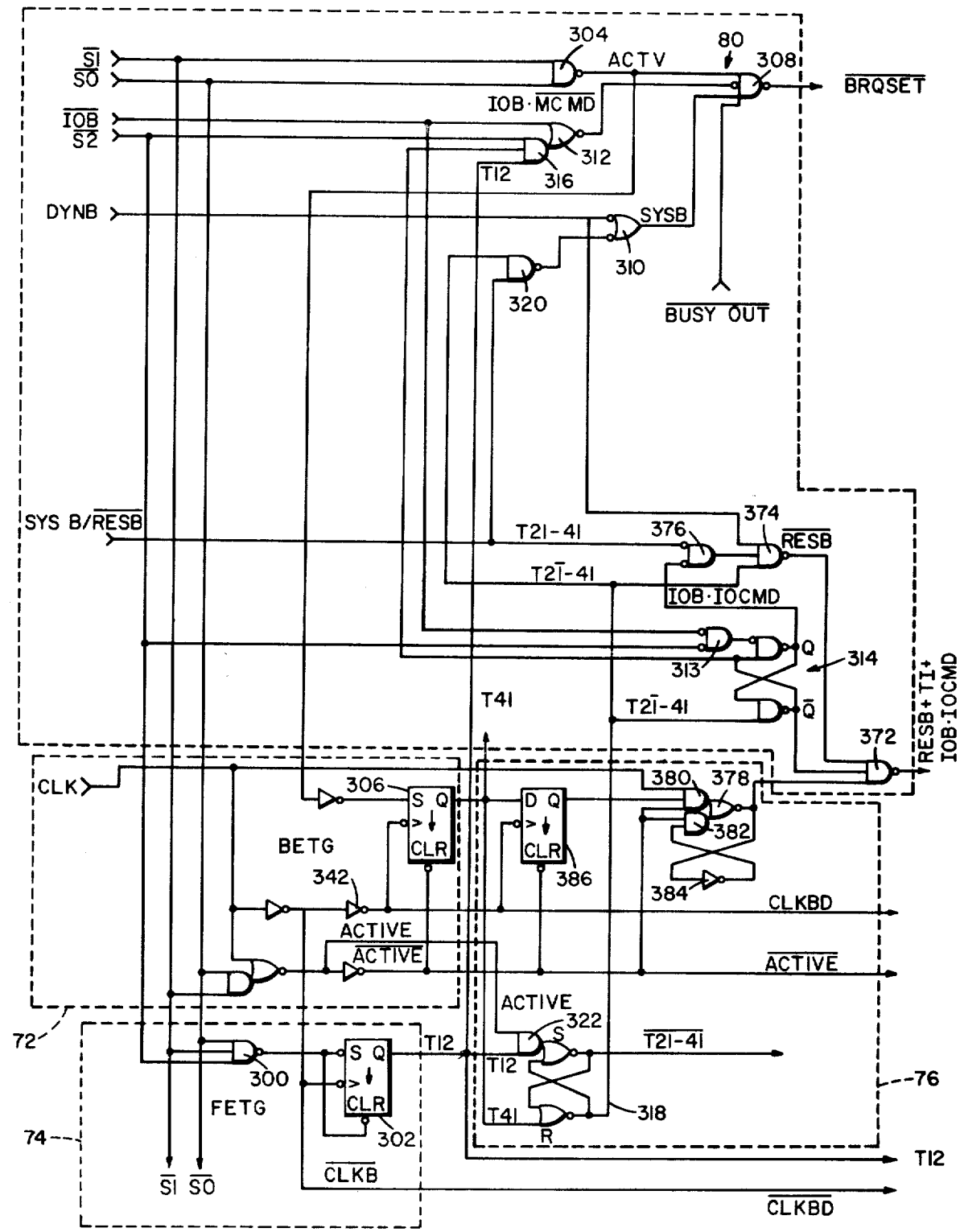

Bus arbitration is effected by the present invention by the use of a novel bus arbiter which typically operates in conjunction with a novel bus controller to interface a processor, such as a central processing unit of the type as described and disclosed in the co-pending applications entitled "Extended Address, Single and Multiple Bit Microprocessor," Ser. No. 873,777 filed Jan. 31, 1978, and "Concurrent Cooperative Coprocessing Circuitry and Methodology", Ser. No. 921,082, filed June 30, 1978, and assigned to the same assignee of the present invention. However, it must be understood that the bus arbitration method and a circuitry to effect the method of the present invention can be combined with many other types of processors.

The processor is unaware of the arbiter circuit's existence and issues commands as though it had exclusive use of the system bus. If a processor does not have the use of the system bus, the arbiter prevents the bus controller, the data transceivers and address latches which are associated with the processor from accessing the system bus. The processor will enter and remain in the wait state until the bus arbiter acquires the use of the system bus whereupon the arbiter will allow the bus controller, the data transceivers and address latches to access the system bus. Once a command has been issued and a data transfer has taken place, a transfer acknowledge signal (XACK) is returned to the processor and the processor then exits the wait state and completes the transfer cycle. The arbiter and bus controller thus serve to multiplex a processor or bus master onto a system bus and to avoid contention problems between bus masters which share the system bus.

The bus arbiter and controller of the present invention provides an intelligent interface to allow the processor to access the system bus. The arbiter directs the processor and bus controller onto the bus and allows both higher and lower priority bus masters to acquire access thereto. When a higher priority processor completes its transfer cycle on the system bus, including the hold time, lower priority bus masters may obtain access to the bus when the higher priority processor is not actively accessing the system bus, that is during an idle state or during a time in which the processor is accessing a resident or input/output bus. This feature of the present invention is of particularly great utility in those situations in which the processor has the ability to fetch instruction in advance of execution and to internally store the instructions in a queue or equivalent means. Because the processor can fetch code faster than it can execute it, the processor may enter one or more idle states while executing the codes stored in its queue. The bus arbiter will then permit the system bus to be surrendered to a lower priority bus master during these idle states for such duration until the higher priority processor is ready to re-access the system bus to fetch more instructions or data.

Overall Timing and System Organization

FIG. 1 illustrates a typical embodiment whereby the bus arbitration scheme and circuitry of the present invention is used to time share a system bus 20 among a plurality of processors such as a central processing unit (CPU) 22 and one or more input/output processors 24 and 26. Each processor is associated with a corresponding arbiter circuit 28, 30 or 32 as illustrated in FIG. 1. In addition, each CPU and arbiter has a corresponding bus interface circuit 34, 36 and 38 which interfaces its corresponding CPU to system bus 20 or a corresponding resident or input/output peripheral bus 40, 42, or 44. Resident bus 40 and I/O-peripheral buses 42 and 44 may be coupled to a plurality of dedicated memories or input/output devices according to the application at hand. Thus, interface circuits 34, 36 and 38 actually include a plurality of functional subparts which are typically divided between system bus 20 and the resident I/O-peripheral buses 40, 42, and 44. That is, part of the bus interface circuitry will be dedicated solely to interfacing with the resident or I/O peripheral bus, and the remaining portion of the bus interface circuitry will be dedicated solely to interfacing with system bus 20.

System bus 20 also has coupled thereto a priority assignment circuit 46, certain ancillary system bus circuitry such as a system bus clock 48 and one or more memory devices 50. Each of circuits 46, 48 and 50 are conventional digital circuits or modules well known to the art. System bus 20 includes not only an address and data bus, but a plurality of control lines included in a control bus, which control lines couple the arbiters and interface circuits to priority circuit 46, system bus clock 48 and memory 50. The priority circuit 46 includes a conventional encoder and decoder which assigns a priority to each arbiter according to conventional parallel bus arbitration techniques. The bus priority arbiter will then access the bus and maintain its control over system bus 20 until forced off the bus by a higher priority request or until it voluntarily surrenders the bus during a nonaccessing mode to a lower priority arbiter as described below.

For example, in the illustration of FIG. 1, assume that arbiter 28 has the highest priority followed by arbiters 30 and 32 in that order. Thus, according to the present invention arbiter 28 will surrender system bus 20 to either arbiter 30 or 32 during a nonaccessing mode. Similarly, arbiter 30 will recognize a lower priority request from arbiter 32. Arbiters 30 and 32 will each recognize and respond to bus requests from a higher priority arbiter. Each arbiter, processor and interface circuit combination can be thought of as a bus master, the remaining bus masters being considered as external bus masters by the bus master then having control and access over bus 20.

Arbiter 28 is capable of operating in a dynamic bus mode, DYNB, and an input/output peripheral bus mode, IOB. In the IOB mode the input/output processor may access both an IO peripheral bus 44 and system bus 20. When in the dynamic bus mode, the processor may communicate both over resident bus 40 and system bus 20.

For example, in the IOB mode processor 26 in FIG. 1 communicates and controls a host of peripheral devices over IO peripheral bus 44. Thus, a dedicated memory may, as a special case, be treated as an input/output peripheral. When a peripheral device requires intelligent processing, IO processor 26 accesses the dedicated memory for the proper IO driver subroutine and services the peripheral device by transmitting or storing peripheral data in the buffer storage area of the dedicated memory. The dedicated memory may be emptied or replenished from system memory 50 via bus 20.

Similarly, non-IO processors can communicate with the memory and peripherals of both system bus 20 and resident bus 40 just as IO processors do. Conventional memory mapping techniques can be applied to select which of the busses are to be accessed. As will be described below, the system signal, system bus/resident bus, SYSB/$\overline{\text{RESB}}$ instructs the arbiter whether or not system bus 20 is to be accessed and also enables or disables commands from a selected one of bus controllers 52 or 58 of FIG. 2. Many other types of combinations with dedicated busses or multiple system busses are also possible by combinations of the strapping options of the bus arbiter and bus controller of the present invention. Thus, it is possible for a non-IO processor to have access to the input/output peripheral bus and system bus; and for an input/output processor to have access to a resident bus as well as a system bus. If the strapping options IOB and DYNB, are both strapped false, the arbiter will interface the processor to the system bus only. If both options are strapped true, the arbiter interfaces the processor to system bus, resident bus and IO bus.

The means by which any one of the arbiters gains control or surrenders access of system bus 20 can be better understood by viewing FIG. 2 which shows in a simplified diagram one possible means by which a processor, in this case CPU 22, may be combined with an arbiter 28 and various interface circuitry to effect the bus arbitration technique of the present invention including a system and resident bus. FIG. 2 lists a plurality of specific command signals between arbiter 28 and system bus 20 as well as those system command signals coupling system bus 20 and system bus controller 52. In the embodiment illustrated in FIG. 2 a resident command bus 62, resident address bus 63, resident data bus 65, system command bus 29, system address bus 55 and system data bus 57. Bus controller 52 is coupled to a corresponding conventional address latch 54 and conventional data transceiver 56, each of which is appropriately coupled to system bus 20. Duplicate interface circuitry is provided by bus controller 58, address latch 60 and data transceiver 62 with respect to the resident bus. Only the system bus interface circuitry will be described inasmuch as the resident interface circuitry is identical. The SYSB/$\overline{\text{RESB}}$ input to arbiter 28 serves to instruct arbiter 28 whether or not system bus 20 is to be accessed, and to enable or disable commands from one of the bus controllers 58 or 52.

FIG. 3 illustrates an input/output processor 66, in combination with bus arbiter 28 and bus controller 52. Arbiter 28 and bus controller 52 are each coupled to a substantially similar set of address latches and data transceivers which in turn are coupled respectively to system bus 20 and an input/output peripheral bus. Thus, by strapping the IOB options active and coupling the output of bus controller 52, DT/$\overline{\text{R}}$, $\overline{\text{PDEN}}$, $\overline{\text{DEN}}$ and ALE, as described below, to latches 53 and 55 and data transceivers 57 and 59 as illustrated in FIG. 3, a single bus controller and arbiter can service input/output processor 66 with respect to an IO bus and system bus. In the embodiment illustrated in FIG. 3, address latches 53 and 55 are selected and enabled both on system and peripheral accesses (latch 55 being always enabled) while data transceivers 57 and 59 are selectively enabled by appropriate coupling of the chip select to the $\overline{\text{DEN}}$ and $\overline{\text{PDEN}}$ signal of bus controller 52, respectively. Similarly, with respect to a resident bus as illustrated in FIG. 2, address latches 50 and 54 and data transceivers 62 and 56 are selected by their corresponding bus controllers 58 and 52.

FIG. 4 illustrates another embodiment of the present invention wherein arbiter 28 and bus controller 52 are combined in a complex system with both non-input/output processors such as CPU 22, FPU 64 and an input/output processor 66, each of which have access to the system bus. In this case, input/output processor 66 is converted into a competing local bus master with the non-input/output processors 22 and 64. Control between processors 22, 64 and 56 of the local bus is shared as described in the copending application assigned to the same assignee as the present invention entitled "Apparatus and Method for Cooperative and Concurrent Coprocessing of Digital Information" while arbiter 28 and bus controller 52 will couple the controlling processor to system bus 20 according to the present invention. The examples of FIGS. 2, 3 and 4 have only been shown by way of example, and do not limit the in any other ways in which arbiter 28 and bus controller 52 of the present invention may be combined with other system elements to access a plurality of different types of systems. For example, it is entirely possible that the arbiter and bus controller of the present invention may be combined in processing systems which access two independent system busses and which in turn may access a resident or input/output peripheral bus in addition to multiple system busses.

The arbiter of the present invention cooperatively operates with a corresponding bus controller, such as controller 52 as shown in FIGS. 2, 3 and 4, as described below in greater detail. Bus controller 52 performs the task of establishing the appropriate setup time while arbiter 28 establishes the hold time. The setup time is defined as that period of time during which addresses and enabling signals must be set up before a valid command can be received for execution. Hold time is defined as that duration after the operative command goes inactive during which a data, and/or address signal must remain valid.

Arbiter 28 communicates with bus controller 52 by the single output signal, address enable, AEN. When arbiter 28 has determined that its corresponding processor may access system bus 22 it activates AEN. For example, as shown in FIG. 3 AEN enables the address latch 53 and ultimately triggers $\overline{\text{DEN}}$ or $\overline{\text{PDEN}}$ from bus controller 52 as described below to enable data transceivers 57 or 59. Similar organization is illustrated in FIGS. 2 and 4. After the appropriate command setup time has passed, bus controller 52 will issue the appropriate command as described below. Arbiter 28 will establish the appropriate command hold time and then bring AEN inactive or false when surrendering bus 20.

Input/Output Description of the Arbiter

FIG. 2 illustrates the logical pin configuration of bus arbiter 28. The logic input and output signals of arbiter 28 can be generally classified into four categories: processor related status signals such as $\overline{\text{S0}}$, $\overline{\text{S1}}$, $\overline{\text{S2}}$, $\overline{\text{LOCK}}$, LPLOCKOUT and CLOCK; strapping options such as DNYB, ANYROQST and IOB; system bus interfacing signals, such as INIT, BCLK, $\overline{\text{BREQ}}$, $\overline{\text{BPRN}}$, $\overline{\text{BPRO}}$, $\overline{\text{BUSY}}$, $\overline{\text{LPBREQ}}$; and system signals such as SYSB/$\overline{\text{RESB}}$, and AEN. In addition, pins are provided for coupling to power supply and ground.

Consider now the processor related signals, such as the status input signals $\overline{\text{S0}}$, $\overline{\text{S1}}$ and $\overline{\text{S2}}$. These pins are coupled to corresponding status output terminals provided on CPU 22 as well as a dedicated FPU, a floating point math chip 64, and IOP 66 shown in FIG. 4. These three status signals form a three bit field which provides eight distinct coded status states, such as interrupted knowledge, read input/output port, writer input/output port, halt, code access, read memory, writer memory and passive, as shown in TABLE 1 below.

TABLE 1

| | $\overline{\text{S2}}$ | $\overline{\text{S1}}$ | $\overline{\text{S0}}$ | |
|---|---|---|---|---|
| I/O | 0 | 0 | 0 | Interrupt (INTA) |
| | 0 | 0 | 1 | IO READ |
| | 0 | 1 | 0 | IO WRITE |
| | 0 | 1 | 1 | HALT |
| MEM | 1 | 0 | 0 | CODE ACCESS (Memory Fetch) |
| | 1 | 0 | 1 | MEMORY READ |
| | 1 | 1 | 0 | WRITE MEMORY |
| | 1 | 1 | 1 | TI (IDLE) |

Bus arbiter 28 will decode this three bit field to initiate the appropriate bus request and surrender actions.

The clock signal, CLK, is provided by a separate, clock chip 68 which provides the local bus clock and clocking signals for each of the circuits shown in FIG. 4. Such a clock chip is marketed under the INTEL trademark, 8284 Clock Chip.

The signals LOCK and LPLOCK are processor generated signals which are inputs to bus arbiter 28. In some instances LPLOCK may be indirectly generated by a processor. LOCK serves to prevent bus arbiter 28 from surrendering system bus 20 to any other bus arbiter or bus master regardless of that master's assigned priority. The signal, LPLOCK, serves to prevent arbiter 28 from surrendering system bus 20 only to those other bus arbiters or masters which have a lower assigned priority than arbiter 28.

The strapping options are inputs to arbiter 28 which may be set at a fixed potential and thereby set arbiter 28 in one of a number of fixed optional modes. As discussed, the strapping option dynamic bus, DYNB, configures arbiter 28 so that it may operate in computer systems having both a system bus and a resident bus. When DYNB is activated, system bus 20 is requested or is allowed to be surrendered as a function of the value of the system input signal, SYSB/RESB. The strapping option any request, ANYRQST, is an option which permits system bus 20 to be surrendered to a lower priority arbiter as though it were an arbiter having an assigned higher priority. The strapping option, IO bus, IOB, is an option which configures arbiter 28 to operate in computer systems having both an input/output peripheral bus and a system bus. Arbiter 28 requests and surrenders the use of system bus 20 as a function of status lines S0–S2 in the mode dictated by the chosen IOB option. For example, in FIG. 2, system bus 20 is allowed to be surrendered to a lower priority requesting bus master when processor 22 is performing an input/output command. System bus 20 is requested whenever any one of the processors performs a memory command.

The system signals are signals which facilitate bus arbiter's 28 awareness of the state of system bus 20 and its response thereto with respect to the remaining modules in the local bus system such as illustrated in FIGS. 2, 3 and 4. For example, in FIG. 2 the signal system bus/resident bus, SYSB/RESB is a system input signal which informs bus arbiter 28 when system bus 20 is to be requested and surrender permitted when arbiter 28 is configured to operate in the dynamic bus mode. Typically, this signal is generated from a memory mapped circuit such as a decoder or programmable read-only memory (PROM) 53 of FIG. 2 coupled to the address bus of the resident bus and coupled directly to arbiter 28.

The signal, address enable, AEN, is an output signal from arbiter 28 to its corresponding address latches and bus controller 52. Address enable instructs the address latches and bus controller when to tri-state or set the output drivers in a high impedance state.

Consider finally the system bus interfacing signals. The illustrated embodiment is described in the context of a parallel arbitration system shown in FIG. 2 and 2a, but it must be understood that the present invention is equally applicable to serial or rotating priority systems as well. Referring to FIG. 2a bus request, BREQ, is an output signal from arbiter 28 which indicates that arbiter 28 is requesting use of system bus 20 for its corresponding processors. The signal, bus priority in, BPRN, is a signal which is returned to arbiter 28 by priority circuit 46 instructing arbiter 28 that it may acquire system bus 20 on the next bus clock, BCLK, if the system bus is not busy. An active return of BPRN indicates to arbiter 28 that it is the highest requesting arbiter presently seeking access to system bus 20. The signal, BUSY, is a bidirectional signal which instructs all arbiters or masters coupled to system bus 20 if system bus 20 is available. If system bus 20 is available ($\overline{BUSY}$ is high) then the highest priority requesting arbiter, as determined by BPRN returned from priority circuit 46, will access system bus 20 and pull $\overline{BUSY}$ low thereby forcing all other arbiters to remain off bus 20. When the arbiter is done with bus 20, $\overline{BUSY}$ is permitted to go high allowing another requesting arbiter access to system bus 20. Bus priority out, BPRO, is an output signal from arbiter 28 which may be used in conventional serial priority circuitry where BPRO is used as a daisy chain signal coupled to BPRN of the next higher priority arbiter. The interface signal, initialize, INIT, is a system bus input signal generated by a conventional reset circuit to reset all arbiters and masters coupled to system bus 20. Finally, the lower priority bus request signal, $\overline{LPBREQ}$ is a bidirectional signal which, as an input, instructs arbiter 28 if there are any lower priority arbiters then requesting use of bus 20. The $\overline{LPBREQ}$ terminals of each arbiter coupled to bus 20 are commonly coupled. A lower priority arbiter of the present invention has the ability to pull $\overline{LPBREQ}$ low. When in the common bus request mode, $\overline{LPBREQ}$ is strapped low and ANYRQST is strapped high. In that case, a higher priority arbiter will be forced to surrender bus 20 after each transfer cycle. For example, the circuit of FIG. 2a is operationally illustrated in FIG. 2b. On BCLK edge 11, $\overline{BREQ}$ of arbiter 32 goes active low at edge 13 indicating that arbiter 32 is requesting access to the bus. LBREQ, which is a common lower priority bus request line among arbiters 28, 30, 32 and 33, is also pulled low by arbiter 32 indicating that arbiter 32 recognizes that it does not have the bus and that it may be a lower priority requesting arbiter. After an appropriate time as described below, the higher priority arbiter having the bus, here assumed to be arbiter 30, recognizes LBREQ from arbiter 32, surrenders the bus when not accessing the bus and sets $\overline{BREQ}$ signal high at edge 15. Priority is then assigned by circuit 46 to arbiter 32 by setting $\overline{BPRN}$ of arbiter 32 low as shown on edge 17 assuming that arbiter 32 is the highest priority arbiter then requesting the bus. At the same time arbiter 30 pulls $\overline{BUSY}$ high at edge 19 to indicate to the arbiters that it is not on the bus. Arbiter 32 then seizes the bus by pulling $\overline{BUSY}$ low at edge 21 and deactivates $\overline{LBREQ}$ so that it will not read its own lower priority bus request.

Architecture of the Bus Controller

The operation of the bus arbiter of the present invention can be better understood by first examining the operation of the bus controller of the present invention which cooperatively coacts with the bus arbiter to effect information transfers to and from the corresponding central processing units and system bus 20. FIG. 2 diagrammatically illustrates the pin configuration of bus controller 52. As with the arbiter, the pins of the bus controller can be grouped into four logical categories, namely: processor status signals, control input signals, command bus output signals and control output signals. The processor status signals include the signals S0, S1 and S2 which form a three-bit field to signify whether an input/output or memory operation is being executed and the type of operation which a corresponding CPU desires to execute, as summarized in Table 1 above.

The control input signals include the address enable signal, AEN, which enables the command drivers of the bus controller when active and when inactive immediately tristates or sets the command output drivers into a high impedance state. The clock signal, CLK, is the local bus clock provided by clock circuit 68. The input-/output processor mode signal, IOB, is a strapping option which as with the arbiter configures bus controller 52 to allow for a separate IO peripheral bus as well as a system bus. When placed in the IOB mode, certain command drivers, discussed below, will always be enabled regardless of the address enable, AEN, input signal. If IOB is inactive or false, then the non-IO processor mode is selected such that all command drivers are enabled in response to AEN. The command enable signal, CMDEN, forces all command output signals and two of the control output signals, DEN and PDEN, described below to the false state when the command drivers are enabled by AEN. Command enable, CMDEN, is intended for use in systems where both a resident and system bus are employed, each having a separate bus controller. Thus, as illustrated in FIG. 2, CMDEN, serves to select the appropriate bus controller depending on whether the processor desires to access the resident bus or system bus.

The control output signals include a data transmit/-receive signal, DT/R to establish the data direction for conventional data transceiver 56. The address latch enable signal, ALE, is used as a strobe for address latch 54. A master cascade address enable and peripheral data enable signal, MCE/PDEN is a multifunction output pin whose function is configured by the IOB strapping option. When configured in the IOB mode as illustrated in FIG. 3, MCE/PDEN becomes the peripheral data enable signal, PDEN, and serves to enable the data transceivers corresponding to the input/output bus during input/output transfer cycles. When configured in the non-IOB mode, the pin becomes master cascade address enable, MCE, and is used to enable a cascade address from a master priority interrupt controller 55 as illustrated in FIG. 4. The master priority interrupt controller 55 is coupled to the local bus in order that a cascade address may be latched into the address latches to address a slave priority interrupt controller.

The command signals include an advance input/output write command, AIOWC. The advanced IO write commands serves to issue a command early in the machine cycle in an attempt to prevent a fetch-ahead processor such as processor 22 from entering a WAIT state. Similarly, the advance memory write command, AMWC, serves the same function with respect to a memory write command. Conventional memory write and memory read commands are provided by the memory write and read command signals, MWTC and MRDC, respectively. Similarly, conventional input-/output write and read commands are provided by the input/output write and read command signals, IOWC and IORDC. Interrupt acknowledge, INTA, is a conventional output which serves to instruct an interrupting device that its interrupt has been acknowledged and that the interrupting device is then to place information onto the data bus portion of system bus 20 or directly onto the processor's local bus.

Bus Controller Circuitry

As illustrated in FIG. 6 bus controller 52 is organized into five major circuit sections, namely: a front end state generator (FETG) 200, a back end state generator (BETG) 202, an ALE circuit 204, command and control generation logic 206 and bus arbiter interface and setup timing circuitry 208. The front end and back end state generators decode the processor status signals to obtain the T and $\phi$ clock timing therefrom. Once given, the T and $\phi$ timing of the processor, the bus controller can generate the command and control signals for the processor to appropriately couple system bus 20 to the processor after the arbiter has obtained priority to the system bus even though system bus 20 and the processor are driven by different clocks at different frequencies. The processor with which the present invention is designed to operate, operates on a T and $\phi$ clock wherein a $\phi$ 1 and $\phi$ 2 phase clock is generated during each T clock. The transfer cycles are executed during a cycle of four T clocks, T1 through T4. The wait states, TW, may be inserted between the T3 and T4 clock states. T idle states, TI, can be inserted between a T4 clock and a following T1 clock, that is between consecutive machine cycles. The timing scheme used by such processors is that all command and control signals are issued during the intervals T1 through T3. The termination of command and control signals always occur in the time duration between clocks T4 and the subsequent T1 clock of the next succeeding machine cycle. The timing generator of the bus controller is divided into a front end and back end and state generator in order to parallel the operation of the processor. Since an indeterminate number of TW states can be inserted between the generation of the command and control signals and their termination, generation and termination are controlled and timed by substantially independent circuitry in the arbiter and bus controller.

The processor has a multiplexed address and data bus which ALE serves to demultiplex. ALE is generated at the appropriate time to accomplish this task. ALE circuitry 204 generates the address latch enable signal, ALE, which serves to strobe, by conventional means, the address appearing on the local address/data bus of the processor into conventional address latch 54. ALE is generated by circuit 204 in response to processor status input lines to bring ALE active at the proper time with respect to the T and $\phi$ timing clocks.

The command and control output signals are also generated in response to decoded processor status lines. The decoded processor status lines are strobed into their respective latches described below by a strobe signal provided by front end state generator 200. Generator 200 also controls when the decoded signals are issued on the output pins of bus controller 52. The latches are reset according to a timing signal generated by back end state generator 202. Bus arbiter interface and setup circuitry 208 determines when the output commands and control signals are to be coupled to system bus 20.

When in the IOB mode the IO command signals are configured so as to be independent of the bus arbiter interface and setup circuitry 208. This allows systems with separate IO busses to be easily implemented using a bus controller of the present invention. The manner in which the IOB mode is handled by the command logic circuit 206 and interface circuit 208, as well as the means by which bus controller 54 cooperates with bus arbiter 52 can be better understood after examining the operation of each of the circuit blocks of FIG. 6 in greater detail.

Consider FIG. 7a which illustrates the timing state generators. Front end state generator 200 is activated when processor status lines $\overline{S0}$, $\overline{S1}$ and $\overline{S2}$ are combined in NAND gate 210. The output of NAND gate 210 is inverted to create the signal $\overline{ACTV}$ to indicate that the processor status signals have gone from a passive to an active condition. $\overline{ACTV}$ is gated through an inverted input of NAND gate 212 by the inverted local bus clock, $\overline{CLKB}$. The clocked signal, $\overline{PASSIVE}$, is provided to the inverted input of a set-reset latch 214 whose Q output then is indicative of the T1, $\phi$ 1 timing interval. Hereinafter, internal timing signals will be denoted as T11, T12, etc. where the first digit refers to the T state and the second digit to the $\phi$ state to signify the timing interval these internal timing signals signify. However, as can be seen in view of FIG. 8, the duration and exact timing of the Tij signals are rarely identical to the T and $\phi$ states to which they refer.

Thus, flip-flop 214 is set whenever any one of the processor status signals goes true and when $\overline{CLKB}$ goes high. It is possible, however, that the processor status signals may go active or low at the same time as when $\overline{CLKB}$ is high since a race condition exists within the circuitry with respect to these two signals. This condition is illustrated graphically in FIG. 8. However, it takes two gate delays from the time from which the processor status signals go active (low) until the signal, $\overline{ACTV}$ goes low. By this time, $\overline{CLKB}$ is low. Therefore, when $\overline{ACTV}$ goes low, flip-flop 214, whose Q output is T11, will not be set until $\overline{CLKB}$ next goes true, i.e., just after T1 $\phi$ 1. Flip-flop 214 is reset when the processor status signals are each passive. The Q output of flip-flop 214, T11, is coupled to one input of NAND gate 216 whose output in turn is coupled to the inverted input of flip-flop 218. Flip-flop 218 produces an output indicative of the clock interval T1 $\phi$ 2. In other words, when T11 goes true, gate 216 will allow flip-flop 218 to be set on CLKB. Thus, T12 is generated approximately one clock delay after $\overline{CLKB}$ goes low.

The threshold of the inverted $\overline{CLKB}$ input to gate 216 is lower than that of a conventional gate. Hence, $\overline{CLKB}$ must go to a lower logic level in order for that input to be considered active. This guarantees two things, firstly, the signal T11 to flip-flop 218 is delayed slightly longer than one gate delay after $\overline{CLKB}$, to ensure a valid logical output from gate 220 as described below, and secondly, the $\overline{CLKB}$ input to NAND gate 220 has already changed prior to T12 becoming true. T12 from the Q output of flip-flop 218 goes true approximately two gate delays after $\overline{CLKB}$.

Initially, flip-flop 222 is reset by NAND gate 224 whose inputs are $\overline{T12}$ and, $\overline{PASSIVE}$, the inverted output of gate 210. When flip-flop 222 is reset, the Q output is coupled through an inverter to one input of NAND gate 226 whose output then goes high. The output of NAND gate 226 is the timing signal $\overline{T22}$ indicative of T2, $\phi$ 2. The output of NAND gate 226 is fed back to gate 220. On the next $\overline{CLKB}$ true pulse, the signal T12 is gated through NAND gate 220 and set-reset flip-flop 222 is set. The Q output, T21, of flip-flop 222 is indicative of the timing combination T2 $\phi$ 1. T21 thus becomes true approximately three gate delays after $\overline{CLKB}$. Thus, when gate 226 goes high, gate 220 is enabled and flip-flop 222 is free to be set. When T12 and $\overline{CLKB}$ both go high flip-flop 222 will be set. Both inputs to gate 226 will be high after flip-flop 222 is set and will remain high as long as flip-flop 222 remains latched.

The front end state generator will remain in this state until the status lines go into the passive condition. Approximately four gate delays after the processor status signals go passive the front end state generator flip-flops 214, 218 and 222 will reset. Gate 224 guarantees that flip-flop 218 is reset prior to flip-flop 222. If this were not the case, it would be possible to cause a spurious T21 output from flip-flop 222 should flip-flop 218 be slow to respond.

The back end state generator, also shown in FIG. 7a, is initiated into operation when the processor status lines go into the passive condition. NAND gate set-reset flip-flop 228 generates a timing signal indicative of the $\overline{T3}$, $\phi$ 2 timing combination. The set input of flip-flop 228 is coupled to NAND gate 230 whose inputs in turn are $\overline{S0}$, $\overline{S1}$ and CLK. The reset inputs to flip-flop 228 are coupled to $\overline{S0}$ and $\overline{S1}$. Thus, flip-flop 228, will be reset when either $\overline{S0}$ or $\overline{S1}$ become active. However, when $\overline{S0}$ and $\overline{S1}$ are both high, indicating the passive condition, flip-flop 228 will be set when CLK goes high. It takes three gate delays from the time that CLK goes high before the signal $\overline{T32}$ output from flip-flop 228 is generated. At this time $\overline{CLKB}$ is low. Therefore, $\overline{CLKB}$ is low two gate delays prior to $\overline{T3}$ $\phi$ 2 going active so that, as described below, the command signals may be setup prior to the operative timing signal.

Set-reset NAND gate flip-flop 232 has its set input coupled to the output of NAND gate 234 whose inputs in turn are coupled to $\overline{CLKB}$ and an inverted input coupled to flip-flop 228. The reset terminal of flip-flop 232 is coupled to the signal T11 from flip-flop 214 through an inverted input. The output of flip-flop 232 is a signal indicative of the timing combination $\overline{T4}$, $\phi$ 1. The $\overline{CLKB}$ input to gate 234 is low by the time $\overline{T32}$ goes active, the output of flip-flop 232 is coupled to the input of NAND gate 236 whose other input is the signal CLK. The output of NAND gate 236 is indicative of the timing combination T4, $\phi$ 2. This signal goes active low, one gate delay after T4, $\phi$ 1 when CLK goes high, that is one gate delay into the $\phi$ 2 clock of the T4 interval as shown in FIG. 8. It should be noted that the processor status signals, $\overline{S0}$, $\overline{S1}$, $\overline{S2}$ may go active low at any time during the dotted interval 210 illustrated in FIG. 8. This skew is permitted and its effect on the remaining timing signals is reflected by corresponding dotted intervals illustrated with respect to each of the remaining timing signals seen in FIG. 8.

The flip-flops 228 and 232 of the back end state generator are reset when the processor status lines go active. It should be noted that while the front end state generator is triggered into operation when any of the three processor status lines go active, the back end state generator is triggered into operation by all the status signals going inactive. The only condition under which it is possible to trigger the front end state generator and not reset the back end state generator is during a HALT cycle. During the HALT cycle the front end state generator is triggered into operation in order that an ALE pulse can be generated, as described below. The back end state generator is kept active in order to keep the command and control logic in a terminated condition.

The command and control logic derive their timing signals from the front end and back end state generators. Signals from the state generators serve to setup the command and control logic so that on the following clock edge the command and control signal is either issued to terminated. The state generators are designed to allow the command and control signals to be setup prior to the clocking edge so that when the edge does occur, the command or control signal can be gated out as fast as possible with respect to that edge through high speed propagation paths.

Conventional decoders using AND gates as shown in FIG. 7b decode which of the command signals are to be generated according to the processor status signals S0, S1 and S2. The circuitry used to generate each individual command is substantially identical and is comprised of two cells. A first cell 238 or 242 serves to quickly generate the command while a second cell 240 or 244 serves to quickly terminate the same command. The commands are distinguished in that certain of the commands are advanced and certain are not advanced. First cells 238 and 242 differ in that cell 238 generates an advanced command and cell 242 generates a corresponding normally timed command. Second cells 240 and 244 differ in that cell 240 will not tristates its corresponding command by the signal AEN when in the IOB mode, as described below, while cell 242 tristates its command in all cases by AEN. Thus, with respect to the advanced commands such as advanced I/O WRITE command, $\overline{\text{AIOWC}}$, a modified cell 238 is provided to setup the advanced command and a modified cell 240 is provided to terminate the command.

Consider for example the advanced input/output write command $\overline{\text{AIOWC}}$. When an encoded command is received from the processor status lines, front end state generator 200 is initiated as described above when the processor status signals go active. By T1, φ 2 the output of AND gate 246 is valid indicating the decoded IO WRITE command. Since, as shown in FIG. 8, T12 is delayed until the clock pulse $\overline{\text{CLKB}}$ goes low, NAND gate 248 is enabled by the time the decoded status signals are valid. AND gate 250 is disabled when $\overline{\text{CLKB}}$ goes low. The other inputs to AND gate 250 are the signals $\overline{\text{T22}}$, T12, and the decoded command signal, IOWRD. Thus, on the rising edge of $\overline{\text{CLKB}}$ each of the inputs to AND gate 250 are true. The output is coupled through OR gate 252 and buffered by a conventional tristated NAND gate 254. The output of NAND gate 254 is the advanced IO write command, $\overline{\text{AIOWC}}$. The output of NAND gate 248 is coupled to the inverted set input of set-reset flip-flop 256. The $\overline{\text{Q}}$ output of flip-flop 256 is coupled to the inverted input of OR gate 252 so that once flip-flop 256 is set, the command signal is held even though the status signals may go inactive until terminated as described below.

The Q output of flip-flop 256 is coupled to cell 242. It should be noted that cell 242 depends upon cell 238 for its operation. In cell 238 the command is issued and latched in flip-flop 256 while the processor status lines are still valid. However, in cell 242 the commands have to be issued and latched into flip-flop 268 at a time when the processor status lines are in transition. Commands are issued from cell 242 at T3, φ 1 which corresponds to the transitioning times for the processor status signals as shown in FIG. 8. Thus, flip-flop 256 serves as a status condition flip-flop for flip-flop 268. The Q output is coupled to one input of AND gate 260 whose other inputs are CLKB and T22 from front end state generator 200. The output of AND gate 260 is coupled to OR gate 262 whose output in turn is coupled to an input of conventional tristated NAND gate 264. The output of NAND gate 264 is the command signal $\overline{\text{IOWC}}$. The $\overline{\text{Q}}$ output of flip-flop 256 is coupled to cell 242 to the inverted input of NAND gate 266. The other inputs of NAND gate 266 are the signals $\overline{\text{CLKB}}$ and T22. The output of NAND gate 266 is coupled to the inverted set input of RS flip-flop 268. The $\overline{\text{Q}}$ output of flip-flop 268 is coupled to the inverted input of OR gate 262 to keep the command signal valid once flip-flop 268 is set and until terminated as described below. Thus, even when AND gate 260 in cell 242 has been disabled, the flip-flop will then be set and the command retained.

The AND and OR gate combinations 250–252, and 260–262 in each case provide a fast gate combination to provide a high speed path through the corresponding cell. When the processor status signals, S0, S1 and S2 go from the active to the passive condition, timing delays and stray capacitances may be such that spurious pulses could appear on the output of the various decoders. The $\overline{\text{T22}}$ input to NAND gate 248 and AND 250 prevents these spurious pulses from erroneously setting flip-flop 256 and from causing a spurious spike on the command output gate 254 respectively. Thus, even though the front end timing generator 200 is reset due to the processor status lines going passive, $\overline{\text{T22}}$ will not go high until approximately four gate delays after the decoded status signals have transitioned.

While front end state timing generator 200, through its timing signals, is preventing the decoded processor status lines from setting the command set-reset flip-flops, back end state generator 202 will have been initiated into operation. Upon φ 2 of T3, the $\overline{\text{T32}}$ signal is activated, active low. $\overline{\text{T32}}$ appears two gate delays after $\overline{\text{CLKB}}$ has gone low. When $\overline{\text{CLKB}}$ goes high, at T4, φ 1, flip-flops 256 and 268 are reset by $\overline{\text{T3 RST}}$ which is the output of NAND gate 270. The inputs to NAND gate 270 are T32 and $\overline{\text{CLKB}}$. The $\overline{\text{T3 RST}}$ signal is duplicated in cells 240 and 244 by fast NAND gates 272 and 274 respectively. The output of NAND gates 272 and 274 provide a high speed terminate command delayed by approximately one gate delay. By the end of the terminated command pulse from gates 272 and 274, $\overline{\text{T3 RST}}$ has reset each of the command set-reset flip-flops thereby maintaining the command in the terminated condition.

When acquiring system bus 20, arbiter 28 does not establish at which time the command should be issued but instead issues $\overline{\text{AEN}}$ to merely communicate to bus controller 52 that arbiter 28 has the system bus and that bus controller 52 may determine for itself when to issue the command. Thus, the timing between setup and termination of the commands with respect to system bus 20 is shared between arbiter 28 and bus controller 52 by communication of the single signal, $\overline{\text{AEN}}$. The setup time is established by delay line 280, which typically delays its output 65 nanoseconds from the input. When $\overline{\text{AEN}}$ goes active or low, each of the command driver cells 240 are immediately enabled, however, all command outputs are held false until the command on line, CMDON, goes true according to the output of gate 282 and delay line 280. By this means, the address to command setup time is reliably established. In the case of IO commands, IOB overrides the CMDON setup and AEN control since in the IOB mode the processor will have a separate IO bus independent the system bus.

Each of the advanced and normal command decodes and outputs are similarly shown as in FIG. 7 by appropriate coupling and replication of cells identical to cells 238, 240, 242 and 244. It should be noted that the single input signal for the setup and termination of the command signals is through an arbitration interface circuit 276 whose input is the signal $\overline{AEN}$. $\overline{AEN}$ is coupled through an inverter to the tristate input of gate 264 of cell 244, and to NAND gate 278, whose output is coupled to the tristate input of gate 254 of cell 240. The other input to AND gate 278 is $\overline{IOB}$ which is the strapping option signal described above. Each of the tristated gates described above are immediately enabled when the tristate input is high and are floated when the tristate input is low. The IO command circuitry is enabled at all times when in the IOB mode, or selectively enabled after a delay according to $\overline{AEN}$ received from bus arbiter 28 when not in the IOB mode as determined by a delay line latch described below.

$\overline{AEN}$ is coupled to the input terminal of a conventional delay circuit 280 whose output is coupled to the inverted input of AND gate 282. The other inverted input of AND gate 282 is connected directly to $\overline{AEN}$. The output of AND gate 282 is coupled to an OR gate 284 in cell 240. The other inverted input of OR gate 284 is coupled to $\overline{IOB}$. The output of OR gate 284 is then coupled to NAND gate 254. When bus arbiter 28 corresponding to the bus controller gains access to the bus, $\overline{AEN}$ goes low. In the non-IOB mode this will immediately enable NAND gate 254, but the command is disqualified until the setup time is established since gate 284 will keep gate 254 disabled until CMDON goes true. If bus arbiter 28 determines that it should relinquish the bus, $\overline{AEN}$ signal is dropped after a holding time is established by arbiter 28. $\overline{AEN}$ then goes high which disables the command drivers and forces the line, CMDON, or one input to OR gate 284 false and its output false, assuming a non-IOB mode, i.e. IOB is strapped low. This in turn disables gate 254. At the same time when $\overline{AEN}$ goes high gate 254 is floated by the output of gate 278, when in the non-$\overline{IOB}$ mode. In the IOB mode, circuitry 276 is ignored by coupling IOB to an inverted input to gate 284 whose output to gate 254 is constantly high thus ignoring circuitry 276. Cell 244 is identical to cell 240 with the exceptions that gate 284 is deleted and replaced by a direct coupling to CMDON, and gate 264 is tristated by a direct coupling to $\overline{AEN}$ rather than by the qualified output of gate 278. Thus, commands using cell 244 to terminate the command have an operation which is not altered by the IOB option, namely the memory read and write commands.

The remaining control inputs and outputs are shown as generated by the logic circuitry illustrated in FIGS. 7c through 7f using the processor status signals, various chip inputs and timing signals from front end state generator 200 and back end state generator 202 to appropriately generate the command and control output signals as shown in FIG. 9. For example, the data enable circuitry is shown in FIG. 7c which generates DEN according to the timing shown in FIG. 9. For a write operation $\overline{DEN}$ is activated during T2, $\phi$ 1 and for a read operation is activated during T2, $\phi$ 2. A read command is generated by a set-reset flip-flop as shown in FIG. 7c while the WR signal is generated by AND and NOR gate combinations as illustrated. The DEN circuitry operates in a similar fashion in a read operation as it does in the write operation with the exception that different input restrictions require the use of a set-reset flip-flop in a read operation. In a write operation the status lines are valid at the time when the write NAND gate codes the state lines, i.e. on $\phi$ 1 or T2. For read operations the status lines are changing at the point where the DEN is activated, i.e. on $\phi$ 2 and T2. Thus, the read set-reset flip-flop is required to remember the condition and the status lines so that the DEN circuitry can be safely strobed. The read flip-flop is set on $\phi$ 2 of T1 and on $\phi$ 2 on T2, the $\overline{DEN}$ flip-flop is strobed. As is the case in the light operation, the $\overline{T2\ \phi\ 2}$ term to the NOR gate decoder coupled to the set input of the read flip-flop prevents the flip-flop from being accidently set by a spurious spike when the status lines are going to the passive condition.

The DATA TRANSMIT/RECEIVE signal, DT/$\overline{R}$, establishes the data direction of the data transceivers. The logic circuitry for generation of DT/$\overline{R}$ is shown in FIG. 7d. Depending on whether the corresponding processor is performing a read or write operation, the state of DT/$\overline{R}$ is determined from a set-reset flip-flop as illustrated in FIG. 7d. If the write operation is performed then the flip-flop remains reset or DT/$\overline{R}$ remains high. Thus, DT/$\overline{R}$ is set only for a read operation.

The master cascade address enable/peripheral data enable signal, MCE/$\overline{PDEN}$, is shown as generated by the logic circuitry of FIG. 7f. This circuitry generates the signal, $\overline{PDEN}$, to control the transceivers and other devices on the IO bus which are to be enabled onto the processor's local bus during input/output cycles in the IOB mode. Depending upon whether an IO read or write operation is performed determines when the $\overline{PDEN}$ signal is activated. For a WRITE operation $\overline{PDEN}$ is activated on T21 and for a READ operation it is activated on T22 as shown in FIG. 9. Bus controller 52 must in an IOB mode in order for PDEN to be generated. In addition, PDEN is qualified by the signals CMDEN and IO. IO is generated by the DEN circuitry of FIG. 7c and allows $\overline{PDEN}$ to be generated only if the present processor is performing an IO cycle. CMDEN is a user generated qualifier which provides useful system and resident bus system configurations. The timing for $\overline{PDEN}$ is generated by the circuitry of FIG. 7f as shown in FIG. 9. The same circuitry generates the MCE signal in the non-IOB mode which is used to enable an address from a priority interrupt controller such as marketed under the INTEL trademark 8259A. The address is enabled from the priority interrupt controller 55 onto the processor's local bus. ALE is used in conjunction with MCE to latch the addresses onto the system address latch 54. MCE is only activated during an interrupt acknowledge cycle and has the timing as shown in FIG. 8 when generated with the circuitry as illustrated in FIG. 7f.

The command enable signal, CMDEN, is an input term connected directly to each of the command drivers, gate 254 of cell 240 which disables the drivers and terminates the DEN and PDEN control signals as can be seen from FIGS. 7c and 7f. Bus controller 52 is designed so that CMDEN may change states after a command has been terminated, that is in T4, $\phi$ 1, until a point just before a command is issued, that is T2, $\phi$ 1. By itself the CMDEN input is of limited value, but when tied to the system bus/resident bus input pin, SYSB-/$\overline{RESB}$ of arbiter 28 as illustrated in FIG. 2, it allows for great flexibility in allowing a single arbiter to access both a multimaster system bus 20 and a resident bus. In such an instance, the CMDEN input to bus controller 52 and the SYSB/$\overline{RESB}$ input to arbiter 28 are driven by an address decoder 53 coupled to address latch 60, as shown in FIG. 2. The address range according to conventional memory mapping techniques will determine the state of SYSB/RESB /and CMDEN.

The address latch enable circuitry, shown in FIG. 7e generates ALE which is used to strobe the address latches. When the processor status become active, the ALE pulse is generated by the circuitry of FIG. 7e. Even though status lines may become active in the clock period T4, $\phi$ 2, ALE is not generated until T1, $\phi$ 1.

Architecture of the Arbiter

In light of the description of the operation of the bus controller the means by which arbiter 28 operates can now be better understood by considering its internal architecture as illustrated diagrammatically in FIG. 5. The processor status signals are provided as inputs to status and mode decoder 70, a back end state generator (BETG) 72, a front end state generator (FETG) 74 and control circuitry 76.

Since the processor is capable of inserting an indeterminate number of wait states between instruction fetches and since an indeterminate number of inactive states may proceed or follow any transfer cycle, FETG 74 generates internal timing signals when the processor activates the status lines, while BETG 72 generates internal timing signals when the status lines go into the passive condition. FETG 74 is reset when the status lines go passive. BETG 72 will be reset when the status lines again go active.

Consider now the general operation of arbiter 28 as illustrated in FIG. 5. In those modes where the corresponding processor accesses more than one bus, system bus 20 is requested at a later time than in a single bus mode in order to allow sufficient time for the processor status lines to be decoded or for the system input, SYSB/$\overline{\text{RESB}}$ to become valid. In those systems which access only system bus 20, a bus request is made as soon as arbiter 28 detects an active going transistion on the processor status lines 78. Thus, when the processor initiates a transfer cycle, FETG 74 is triggered and initiates a request for system bus 20 at the appropriate time according to the arbiter mode as is then configured in status and mode decode circuitry 70. The initiating timing signal generated by FETG 74 is coupled through control circuit 76 and status and mode decode circuit 70 to bus request set circuitry 80. It is then synchronized to the system bus clock by system bus synchronization circuitry 82. Synchronization is necessary since the processor transfer request is asynchonous with respect to the bus clock. When synchronized, system bus interface circuitry 84 generates an active $\overline{\text{BREQ}}$. When priority circuit 46 of FIG. 1 returns an active $\overline{\text{BPRN}}$, arbiter 28 will seize bus 20 on the next available system bus clock after $\overline{\text{BUSY}}$ goes high, which will indicate to arbiter 28 the release and consequential availability of bus 20. Arbiter 20 then pulls $\overline{\text{BUSY}}$ low again and enables $\overline{\text{AEN}}$.

Once arbiter 28 acquires access to bus 20 and the information transfer has taken place, as signified by a transfer acknowledge return signal to the corresponding processor, the processor status lines will go passive. BETG 72 is then triggered. BETG 72 will generate the proper timing for the bus surrender circuits of arbiter 82 in the event that the conditions which warrant a surrender of bus 20 are met. Such conditions include the loss of priority to a higher priority master, entry into an idle state in the presence of a lower priority request or entry into a non-accessing state with respect to the system bus in the presence of a lower priority request. If a surrender condition is met, bus request reset decoder 86 coupled to interface circuitry 84 will initiate a surrender request. The bus surrender request is synchronized to the processor's local clock through synchronization circuitry 88. When resynchronized to the processor clock, circuit 88 instructs bus controller interface 90 to cause $\overline{\text{AEN}}$ to go high and to reset the bus request set circuitry 80 thereby allowing priority circuit 46 to generate $\overline{\text{BPRN}}$ to the next appropriate bus master requesting use of bus 20. Bus request reset window circuitry 92 is coupled to control 76 and status and mode decoder 70 and has its output coupled to bus request reset decoder 86 to provide a window during which arbiter 28 will allow bus 20 to be surrendered. Furthermore, bus request reset window circuit 92 also forms part of the system bus to processor synchronization together with circuit 88.

Figure 11:
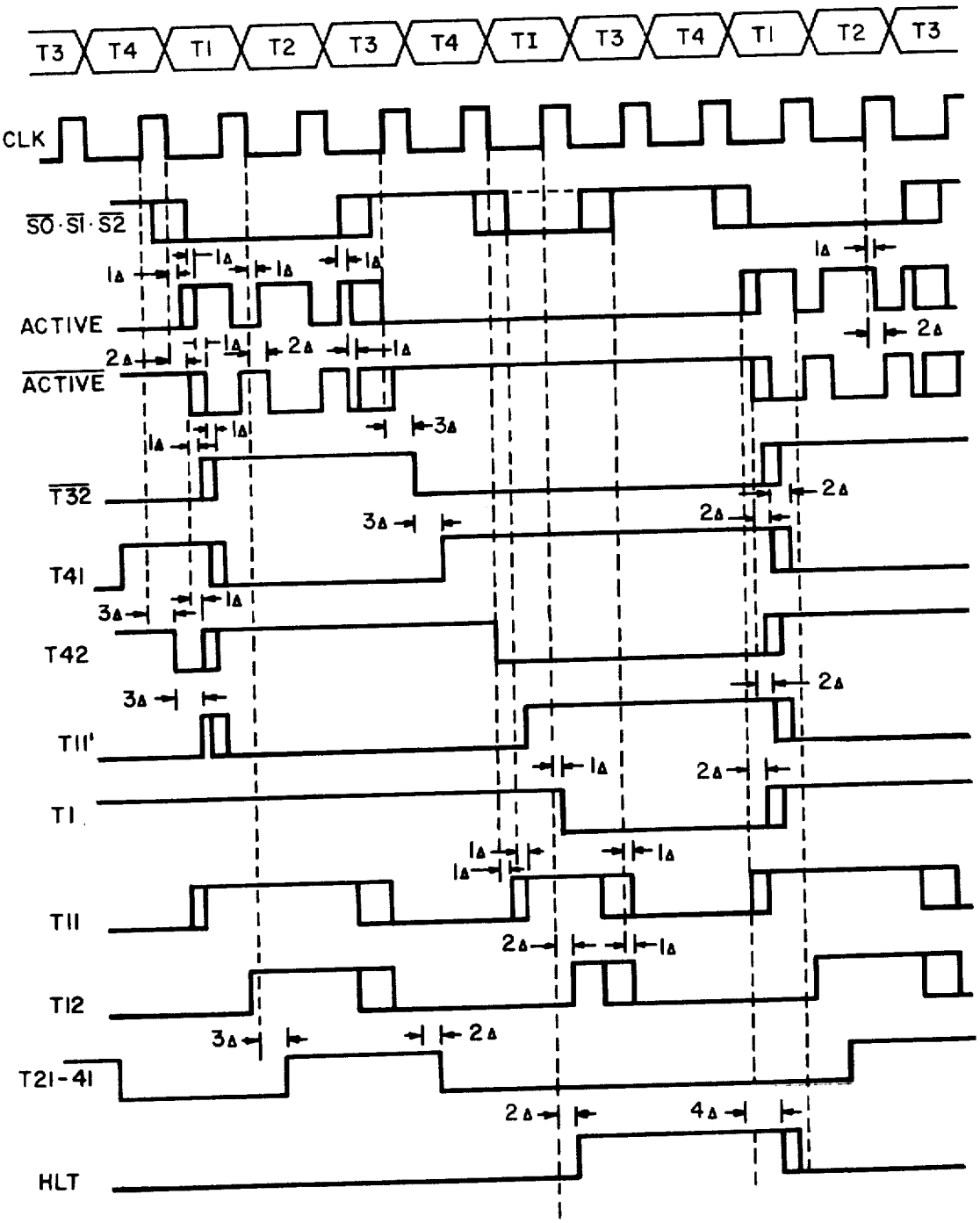
FIG. 11 is a timing diagram showing the relationship of many of the internal signals of the circuit of FIGS. 10a through 10c.

Arbiter 28 as organized as shown in FIG. 5 employs the same general concept of employing a front end state generator 74 and a back end state generator 72 as does bus controller 52. As shown in FIG. 10a the front end state generator 74 is simply comprised of a decoder NAND gate 300 having the processor status inputs $\overline{\text{S0}}$, $\overline{\text{S1}}$ and $\overline{\text{S2}}$ as inputs. The output of NAND gate 300 is coupled to the set input of a clocked flip-flop 302. Flip-flop 302 is clocked on the falling edge of the local bus clock, $\overline{\text{CLKB}}$, through an inverted input. The Q output of flip-flop 302 is the signal T12 indicative of the CLOCK period, T1, $\phi$ 2. Flip-flop 302 is cleared through an inverted input by the output of gate 300. As shown in FIG. 11, during the clock period T1, $\phi$ 1 the processor status signals will be active low. The falling edge of CLK then marks the beginning of the clock phase, T1, $\phi$ 2, from which the signal T12 is generated.

Similarly, back end state generator 72 employs a NAND gate decoder 304 in FIG. 10a. The input to gate 304 are the signals $\overline{\text{S1}}$ and $\overline{\text{S0}}$ and its output, ACTV, indicates that the processor status signals have gone active. ACTV is inverted and then coupled to the set input of flip-flop 306 shown in FIG. 10a in back end state generator 72. Flip-flop 306 is clocked on the falling edge of the local bus clock, CLK, after being delayed through two inverters. Thus, the Q output of flip-flop 306 is the signal T41 indicative of the timing interval T4, $\phi$ 1. T4, $\phi$ 1 marks that event wherein the processor status signals have all gone passive and at which time the command is terminated by the bus controller T41, as illustrated in FIG. 11, is delayed by three gate delays after the clock signal, CLK.

As before, FETG 74 is triggered into operation when the processor activates its status lines. BETG 72 is triggered into operation when the status processor lines go passive and FETG 74 is reset. BETG 72 is reset when the processor status lines again go active. This bifurcated timing, as in the case of bus controller 52, recognizes the fact that all control and command signals are issued in states T1 and T2, while they are terminated in states T3 and T4 with an indeterminate number of wait states, TW, occuring between command initiation and termination and with an indeterminate number of idle state occuring immediately after or before a given transfer cycle.

Bus Request Circuitry

The bus request is initiated by bus request set circuitry 80 illustrated in detail in FIG. 10a. The bus request circuitry requests the bus according to one of a plurality of request modes as summarized in Table 2 below. For example, in the simplist case $\overline{\text{IOB}}=1$ and $\overline{\text{DYNB}}=1$. $\overline{\text{IOB}}$ is coupled to one input of NOR gate 312 whose output is then fixed low. The output of gate 312 is coupled to an inverted input of NAND gate 308. Similarly, DYNB is coupled to one inverted input of OR gate 310 whose output SYSB is coupled to one other input of gate 308. Thus, in the simplist case two inputs to gate 308 leave it in an enabled state. Gate 308 generates an output, bust request set, $\overline{\text{BRQSET}}$ in response to the other inputs, $\overline{\text{BUSYOUT}}$ and ACTV. $\overline{\text{BUSYOUT}}$ as described below is high when subject arbiter 28 does not have the bus. ACTV is generated as the output of NAND gate 304 whose inputs are the status signals $\overline{S1}$ and $\overline{S0}$, i.e. ACTV is high whenever the processor status lines go active.

In the dynamic bus mode, $\overline{\text{IOB}}=1$ and DYNB=1 as shown in the second line of Table 2. The output of gate 312 remains low as before. However, SYSB from gate 310 will vary according to NAND gate 320. The inputs to gate 320 are the signal SYSB/$\overline{\text{RESB}}$ and T21–41 from flip-flop 318. As described T21–41 is high until after the processor status signals go inactive. Therefor, when requesting access to the system bus (SYSB-/$\overline{\text{RESB}}$=1), gate 308 will be enabled to respond to the status lines $\overline{S0}$ and $\overline{S1}$ until and during T21–41 and disabled at all other times.

In the input/output bus mode, $\overline{\text{IOB}}=1$ and $\overline{\text{DYNB}}=1$ as illustrated in the third line of TABLE 2. In this mode, gate 310 has a fixed high output and the output of gate 312 varies as the inverse of AND gate 316. Gate 316 has $\overline{S2}$, T12 and the $\overline{Q}$ output of flip-flop 314 as its inputs. $\overline{S2}$ is high in all input/output transfer cycles as shown in TABLE 1 above. A system bus request, $\overline{\text{BRQSET}}$ is thus made in all IO transfers on or after T12 when $\overline{Q}$ of flip-flop 314 is high. Since $\overline{\text{IOB}}$ is low and coupled to an inverted input to AND gate 313, the output of gate 313 is S2 since $\overline{S2}$ is coupled to the other inverted input to gate 313. On an input/output transfer, S2 is low. Since the of output gate 313 is coupled to the inverted reset input of latch 314, the Q output is high generating the signal IOB.IOCMD. However, T21–41 is coupled to the set input of latch 314. Therefore, when T21-41 goes high, $\overline{Q}$ changes from 1 to 0 or represents $\overline{\text{T21-41}}$. Thus, the output of gate 312 is the logical signal, IOB.$\overline{\text{MCMD}}$, during which condition and timing bus requests are permitted.

In the complex mode, DYNB and IOB are both strapped high. Bus requests are permitted only when gate 312 is low and gate 310 high, each of which gates have a varying signal dependent on the logic and timing discussed above.

Flip-flop 318 is a set-reset NOR gate flip-flop reset by T41 from flip-flop 306 and set by the output of AND gate 322 whose inputs are ACTIVE, which is a pulsed signal as shown in FIG. 11, and T12. Thus, after the processor status signals go active and the timing signal T12 goes high, flip-flop 318 is set and remains set until reset by T41, as illustrated in FIG. 11. During this duration, T21–T41, all commands are active and the processor status signals are active low.

Once a bus request is generated according to the proper status and timing as provided by circuits 70 and 74, as just described, the bus request is synchronized by processor-multimaster bus synchronization circuitry 82, shown in FIG. 10b. Circuit 82 is comprised of two clocked, set-reset edge-triggered flip-flops. The output of NAND gate 308 is coupled to the inverted set input of flip-flop 324 whose Q and $\overline{Q}$ outputs are coupled to the reset and set inverted inputs respectively, of flip-flop 326. Both flip-flops are clocked by system bus clock, $\overline{\text{BCLK}}$, from multimaster bus 20 as delayed by inverters 328. The $\overline{Q}$ output of flip-flop 326 is the signal bus request, $\overline{\text{BREQ}}$. The Q output of flip-flop 326 is coupled to AND gate 330 whose output in turn is coupled to the set input of an, edge-triggered set-reset flip-flop 332. The Q output of flip-flop 332 is the signal BUSY OUT which is inverted by conventional means to become the open collector signal, $\overline{\text{BUSY}}$. The $\overline{Q}$ output of flip-flop 332 is coupled to one input of NAND gate 308 to selectively disable the bus request gate if arbiter 28 already has access to the system bus thereby permitting the bus to be surrendered.

Flip-flop 332 is triggered on the falling edge of $\overline{\text{BCLK}}$. Flip-flops 324, 332 and 326 are high resolution edge-triggered flip-flops and serve to reduce the probability of walk-out. Inasmuch as the bus clock is asynchronous with respect to the input signals received by arbiter 28, a probability of walk-out exists with each flip-flop. Walk-out is defined as the time required for the flip-flop to make a logic decision. If the bus clock is received during the indeterminate period before the logic has settled, a random decision may be propagated. If walk-out occurs with respect to flip-flop 324 it may resolve itself prior to flip-flop 326 being triggered. Even if flip-flop 324 did not quite resolve itself, the probability of flip-flop 326 walking-out to an unacceptable point in time is extremely low. Two system bus clocks after the first bus request has set flip-flop 324, the bus request signal, BREQ, is activated. Thus, if flip-flop 324 walks out far enough in time to allow flip-flop 326 to be set and then flip-flop 324 falls back into a reset condition, flip-flop 332 will not be set. The bus request signal from gate 308 will remain active until arbiter 28 acquires the bus and brings BUSY active. Once BUSY flip-flop 332 is set, NAND gate 308 is disabled. However, arbiter 28 waits until its bus priority signals, BPRN, is received before accessing the bus 20. When bus priority is obtained, BUSY flip-flop 332 is set and the BUSY signal is activated to exclude all other bus arbiters or masters from bus 20. When BUSY is activated, gate 308 coupled to the set input of flip-flop 324 is inhibited thereby allowing flip-flop 324 to be reset only.

The input bus priority in signal, $\overline{\text{BPRN}}$ is coupled to an inverted input of AND gate 330. If the bus priority is returned to the requesting arbiter, gate 330 will be enabled. As soon as the bidirectional bus signal, $\overline{\text{BUSY}}$, goes high, indicating that the bus is available, NAND gate 330 will be completely enabled to permit the output of flip-flop 326 to be gated to flip-flop 332, provided also that flip-flop 324 is set. Flip-flop 332 is then clocked on the next falling edge of BCLK and $\overline{\text{BUSY}}$ is again pulled low by inverter 333 to indicate that the arbiter has seized control of the bus.

Bus Surrenders

Arbiter 28 surrenders system bus 20 under two general sets of circumstances. If arbiter 28 loses priority to a higher priority bus master, bus 20 is surrendered as soon as the present transfer cycle, including hold time, is completed. The bus is surrendered to a lower priority bus master under the condition that the processor associated with arbiter 28 has entered into an inactive or idle state, has entered a state not involving access to the system bus, or has halted. The exact conditions under which the bus is surrendered are discussed below, however, the means by which bus 20 is surrendered to lower or higher priority bus master are identical.

When arbiter 28 has decided to surrender bus 20, a hold time must be established and then the bus request flip-flops 324 and 326 must be reset. The bus request flip-flops must be reset for two reasons. Firstly, if bus 20 is to be surrendered to a lower priority bus master, then arbiter 28 must deactivate its bus request output in order to allow priority to be established in priority resolving circuitry 46 to the highest priority master of the lower priority bus masters then requesting the bus. Secondly, when bus 20 is surrendered to a higher priority bus master and the subject processor is in an inactive state, some precaution must be taken that subject arbiter 28 will not induce the arbiter of the higher priority bus master into surrendering bus 20 at a time when the subject arbiter 28 does not in fact require bus 20.

In the illustrated embodiment arbiter 28 surrenders bus 20 by disabling $\overline{AEN}$ after the hold time has been established and simultaneously allowing the bus request flip-flops to be reset. The associated processor can then generate its next command, but since the command will not be issued inasmuch as $\overline{AEN}$ is false (high), the processor will enter into one or more wait states. Even though arbiter 28 surrenders bus 20, the fact that the corresponding processor is in a wait state and is still active causes arbiter 28 to immediately re-request bus 20.

BREQ reset decoder circuitry 86 generates the signals: any request, ANYRST; lower priority reset, $\overline{LPRST}$; higher priority reset, HPRST; and halt reset, HLTRST, as the outputs of NAND gate decoders 334, 336, 338 and 340 respectively shown in FIG. 10c. The inputs to these NAND gate decoders include the external input signals $\overline{LPLOCK}$, ANYRQST, the delayed clock signal, CLKBD, twice delayed by inverters 342, shown in FIG. 10a, the outputs of certain set-reset flip-flops described below, the $\overline{BUSY}$ output signal and the signal (TI+RESB+IOB.IOCMD). Together these signals include both local bus clock related signals and system bus clock related signals which are each asynchronous with respect to each other.

Table 2 below, summarizes the four conditions under which the bus request reset decoder 86 will require the multimaster system bus to processor synchronization circuitry 88 to reset the bus request flip-flops and to terminate $\overline{AEN}$.

request flip-flop 346 which will then be set on the falling edge of BCLK. The Q output of flip-flop 346 is LPBRQ indicating a lower priority bus request which is coupled as one input to gate 336 in FIG. 10c. When the corresponding processor then enters an inactive state, and if the input signals LOCK and LPLOCK are both false, bus request flip-flops 324 and 326 will be reset and $\overline{AEN}$ terminated as described in greater detail below. As described above, LPLOCK is an overriding input signal used to prevent arbiter 28 from giving up bus 20 to a lower priority bus master. Input signal LOCK is an overriding input signal used to prevent arbiter 28 from giving up bus 20 to either a higher or lower priority bus master. Each is provided as disenabling input to gate 336. LOCK is a processor generated signal which is derived from microcode decoding in the central processor of a software instruction.

When the higher priority bus master requests the use of multimaster system bus 20, it similarly activates its BREQ line and is then returned a $\overline{BPRN}$ from circuit 46 to indicate that it has bus priority. Thus, $\overline{BPRN}$ for arbiter 28 will then high indicating loss of priority. Since $\overline{BUSY}$ is low and $\overline{BPRN}$ is false, the inputs to NAND gate 348 will both be high. The output of NAND gate 348 is coupled to the inverted set input of higher priority bus request set-reset flip-flop 350. On the next falling edge of BCLK, flip-flop 350 will then be set. Assuming that LOCK is high, indicating the lack of any $\overline{LOCK}$ signal, HPBRQ, the output of flip-flop 350, will be gated through gate 338 in FIG. 10c upon CLKBD to generate HPRST.

The any request strapping option treats a lower priority bus master's request as though it were a higher priority bus master's request. When ANYRQST is strapped high, gate 334 in FIG. 10c is enabled. Again, provided that there is no LOCK or LPLOCK signals, arbiter 28 will sample the lower priority bus request through flip-flop 346 and will clock the ANYRQST signal through gate 334 on CLKBD.

Finally, halt request gate 340 serves to force the arbiter off bus 20 if its corresponding processor enters the HALT state. If this were not the case, the system bus efficiency would be degraded whenever another bus

TABLE 2

| MODE | MULTI-MASTER SYSTEM BUS | |
|---|---|---|
| | REQUESTED | SURRENDERED |
| $\overline{IOB}$ . $\overline{DYNB}$ | Whenever the processor's status lines go active | HLT + TI · LPBRQ + HPBRQ |
| $\overline{IOB}$ . DYNB | (SYSB/$\overline{RESB}$ = 1).STATUS ACTIVE | ((SYSB/$\overline{RESB}$ = 0) + TI). LPBRQ + HLT + HPBRQ |
| IOB . $\overline{DYNB}$ | Memory Commands . STATUS ACTIVE | (IO Command + TI). LPBRQ + HLT + HPBRQ |
| IOB . DYNB | (Memory Command ) . | ((IO Commands) + |
| | (SYSB/$\overline{RESB}$ = 1). STATUS ACTIVE | (SYSB/$\overline{RESB}$ = $\phi$) + TI) . (LPBRQ + HPBRQ) + HLT |

Consider first the lower priority reset signal, LPRST, from gate 336. Should a lower priority bus master desire bus 20 it activates its bus request line (BREQ) thereby activating its lower priority bus request signal, LPBREQ from gate 335 in FIG. 10b. Since the system bus signals can be considered only valid during BCLK, they are sampled by edge-triggered flip-flops clocked by BCLK. When LPBREQ goes active low, the inputs to NAND gate 344 in FIG. 10b will be true. Gate 344 is coupled to the inverted set input of lower priority bus master wanted the bus 20. Thus, provided that there is no LOCK signal; provided that arbiter 28 has pulled $\overline{BUSY}$ low; provided that the timing signal T12 has been established; provided that the encoded condition for a HALT command from processor status signals, S0 and S1 are present; and provided the timing signal T21-41 is inactive, gate 340 will generate a halt reset signal, HLTRST.

Flip-flops 354 and 352 together with gates 334–340 provide the system to local bus synchronization necessary to appropriately reset the bus request flip-flops 324 and 326.

Power is conserved and circuit speed increased by combining a windowed and clocked sample flip-flop 352 with an edge-triggered flip-flop 354 which is triggered on a following edge. The system bus related signals received by gate 334–340 are asynchronous with respect to the local bus related signals, the surrender of which is the object of the signals received by gates 334–340. Bus surrender is described as follows.

Each of the gates 334–340 are coupled to an inverted set input of set-reset sample flip-flop 352. The $\overline{Q}$ output of flip-flop 352 is coupled to the inverted D input of resolve flip-flop 354. The Q output of flip-flop 354 is the signal, RESOLVE. Flip-flop 354 is clocked by NAND gates 356, and 360. Gates 356 and 360 are each selectively disabled by $\overline{\text{LCKRST}}$ which is generated by NOR gate 358. Gate 358 has $\overline{\text{BUSYOUT}}$ and the output of AND gate 361 as its inputs. Gate 361 has as its inputs CLKBD, LOCK and AEN. Therefore, gates 356 and 360 will be disabled and flip-flop 354 will not be clocked whenever a LOCK signal is received when arbiter 28 has instructed its corresponding bus controller to issue the commands, i.e. AEN is high. In other words, arbiter 28 will ignore all reset requests when it has the bus and receives a LOCK command. NAND gate 360 provides a lower priority surrender clock. The inputs to gate 360 are discussed below in greater detail.

NAND gate 356 provides a higher priority surrender clock by having its inputs coupled to T41, $\overline{\text{ACTIVE}}$ and CLKBD which is in essence the $\phi$ 2 period. Thus, as described above, when higher priority bus request flip-flop 350 is set on the falling edge of BCLK, sample flip-flop 352 will be set on the next $\phi$ 2 period by reason of CLKBD gating HPBRQ through gate 338. T41 will then be active indicating entry into the T4 timing state whereupon flip-flop 354 will be set. If HPBRQ becomes valid at the end of T3, $\phi$ 2, flip-flop 352 may or may not be able to respond to HPRST and be set. If flip-flop 352 is able to get set in sufficient time, $\overline{\text{AEN}}$ is terminated on $\phi$ 1 of T1 and bus 20 will be surrendered at the worst case two bus clocks later as described below. If flip-flop 352 was unable to get set, system bus 20 will then be surrendered at the next transfer cycle or upon the first clocking of flip-flop 354 to a lower priority bus surrender.

The way in which the arbiter surrenders the bus will depend upon the mode of arbiter 28 as dictated by IOB and DYNB. That is, in the IOB mode, arbiter 28 surrenders bus 20 should another bus master require bus 20 when the corresponding processor is performing an input-output transfer cycle. In the DYNB mode, bus 20 is surrendered if another bus master makes a request when the corresponding processor is accessing the resident bus as determined by the state of SYSB/$\overline{\text{RESB}}$. This is implemented in part by gates 356 and 360.

Consider a lower priority request. NAND gate 372 in FIG. 10a establishes a window which is applied as an enabling input to LPRST gate 336. The inputs to NAND gate 372 are the output of NAND gate 374, flip-flop 314 and the signal TI, representing an idle state. Thus, gate 336 is enabled on the condition that RESB+TI+IOB.IOCMD is true. This logical window is closed at a time appropriate to allow sample flip-flop 352 and resolve flip-flop 354 to resolve any inputs which may have entered gate 336 during the end of the window. Gate 374 provides an active low signal whenever arbiter 28 is in the DYNB mode and is accessing the resident bus. The inputs to gate 374 are DYNB, the output of AND gate 376 and the output of flip-flop 318. The inverted inputs to AND gate 376 are in turn SYSB/$\overline{\text{RESB}}$ and the output of flip-flop 314, which is active in the IOB mode on an input-output command. Thus, $\overline{\text{RESB}}$ is given by the following equation:

$$\overline{\text{RESB}} = \overline{\text{DYNB}} + \text{SYSB}/\overline{\text{RESB}} + \text{IOB.IOCMD} + \overline{\text{T-21-41}}.$$

That is, the signal, $\overline{\text{RESB}}$, is active low thereby providing an enabling window to be created through gate 372 when strapped in the dynamic bus option and a resident bus access is indicated which is not an IO memory command or in which the IOB option is strapped low and during the time interval T21-41. This surrender condition to a lower priority bus request is confirmed by Table 2.

When the associated processor is accessing the resident bus, RESB gate 374 generates a window enabling signal. This window is qualified by T21-41 from flip-flop 318. Enabling gate 374 on the clock interval T2, $\phi$ 1, permits sufficient time for address decoders in the processor to generate SYSB/$\overline{\text{RESB}}$ signal. For slower address decoding, gate 374 remains enabled until the clock T4, $\phi$ 1.

$\overline{\text{TI}}$ is the output of NOR gate 378 in FIG. 10a whose inputs are AND gates 380 and 382. NOR gate 378 is combined with inverter 384 to form a latch such that whenever the processor status signals are in the passive condition, the $\overline{\text{TI}}$ state will be latched active low after once having been actuated. $\overline{\text{TI}}$ is actuated when the processor status signals are passive upon the coincidence of the local clock, CLK and the timing signal T11. T11 is the output of edge triggered D-type flip-flop 386 whose D input is T41. T11 is generated from flip-flop 386 on the falling edge of CLKBD. The timing relationship between T11 and T41 is more clearly illustrated in FIG. 11.

During the interval set by T21-41 when $\overline{\text{RESB}}$ is active, flip-flops 352 and 354 respectively, are clocked at least twice. The first CLKBD will set sample flip-flop 352 and will trigger resolve flip-flop 354 through lower priority timing gate 360. Normally, the first resolve trigger accomplishes no logical function. On the next CLKBD, before the end of T21-41, resolve flip-flop 354 will again be triggered through gate 360 to pickup the output of sample flip-flop 352. The $\overline{\text{RESB}}$ window will then close on T41. If at this time a bus surrender request was received, $\overline{\text{AEN}}$ would go inactive in advance of when the next processor transfer cycle could issue a command in the following T2, $\phi$ 1.

When the processor enters idle states, bus 20 may again be surrendered. Control circuitry 76 detects the presence of an idle state on the first T1, $\phi$ 2 clock. In other words, if the processor control signals are passive during a T11 signal, $\overline{\text{TI}}$ will go true. The window provided by gate 372 generates the signal RESB+TI+IOB.IOCMD within two gate delays with respect to $\overline{\text{CLK}}$. If there is a HALT request indicated by gate 340 in FIG. 10c, sample flip-flop 352 will be set within one gate delay of the window established by the output of gate 372 for a total of three gate delays with respect to $\overline{\text{CLK}}$. As before, resolve flip-flop 354 will be clocked by gate 360 with gate 356 being disabled by a false input on $\overline{\text{ACTIVE}}$.

The processor may exit the idle state as early as T4, φ 2. TI keeps the window of gate 372 active until T1, φ 1. This permits an adequate trigger to be coupled to resolve flip-flop 354. Otherwise, the last trigger pulse coupled to flip-flop 354 at the end of the window provided by gate 372 might be a sharp spike which would leave flip-flop 354 in a logically indeterminate state. As before, with regard to RESB, the first trigger to flip-flop 354 is generally unproductive. The succeeding trigger pulses will set flip-flop 354. However, unlike RESB, at the end of the idle window from gate 372 there is not T41 pulse to clear out any surrender request picked up during the last sampling clock of the window. When the processor exits the idle state, it will directly enter into the start of a new transfer cycle, that is T1, φ 1. There is no need for the processor to be idle or for lower priority bus request to be present if the request caught by sample flip-flop 352 during the previous idle window were carried to the next transfer cycle.

During the interrupt cycle it is not desirable to allow the system bus to be surrendered and this is effected by the input signal LOCK provided as a reset to sample flip-flop 352 thereby preventing the system bus to be surrendered. LOCK may be received as late as T3, φ 1, so long as it is guaranteed that sample flip-flop 352 can be cleared prior to resolve flip-flop 354 being clocked.

In the IOB mode, the processor may access both an IO peripheral bus and system bus 20. The lower priority bus master can then force arbiter 28 to surrender bus 20 when the processor is accessing the IO peripheral bus or when the processor has entered the idle or inactive states. FIG. 11 shows the timing during a HALT and INTERRUPT cycle. The timing for bus surrender during the input/output mode is substantially the same as during the dynamic bus mode. Bus surrendered during idle states and halt cycles are identical to that of the dynamic bus mode. The surrender of the system bus while the processor is accessing the input/output peripheral bus is substantially similar to the resident bus access mode during the dynamic bus mode. In both cases the processor is accessing a bus other than system bus 20. The only difference is that during the IO mode accessing, the signal IOB.IOCMD is latched by flip-flop 314.

Input/output timing during the input/output mode closely resembles the timing of the dynamic bus mode with one exception. In the dynamic bus mode, bus 20 is surrendered only on the condition that SYSB/RESB is low when lower priority bus request flip-flop 346 is set. In the input/output mode, bus 20 may be surrendered whenever flip-flop 346 is set because an input/output cycle automatically generates the IOB.IOCMD signal. Interrupt acknowledge cycles are treated as input/output commands.

It is also possible to simultaneously set the IOB and DYNB options active. In such a case, it would be possible to configure an arbiter of the present invention so that the processor may have access to two or more system busses and an input/output peripheral bus. In such a situation, arbiter 28 would request the system bus, when the processor is performing a memory transfer cycle and SYSB/RESB is high; and would surrender the system bus if the processor is performing an IO transfer cycle or if SYSB/RESB input is low. Thus, if the processor is performing a memory transfer cycle, the system bus is requested or surrendered as a function of the SYSB/RESB input. If the processor is performing an input/output transfer cycle, then the system bus is automatically surrendered.

Each surrender disables AEN which is communicated to the bus controller as described above. AEN is disabled through set-reset flip-flop 364. The set input of flip-flop 364 is coupled to AND gate 362 whose inputs in turn are the signal LCKRST and the Q output of flip-flop 354. The reset input of flip-flop 364 is coupled to AND gate 363 whose inputs are in turn similarly LCKRST and the Q output of flip-flop 354. Thus, when flip-flop 354 has been reset or Q is high and there is no lock reset signal from gate 358, flip-flop 364 will be reset. Q output of flip-flop 364 is combined in AND gate 365 with BUSYOUT. The output of gate 365 is AEN. The Q output of flip-flop 364, which is designated as the signal surrender, SURNDR, is coupled with the BUSYOUT inputs of NAND gate 396 in FIG. 10b. The output of NAND gate 396 is a signal, bus request reset, BRQRST, which is coupled to the inverted reset input of flip-flop 324. Thus, the bus request flip-flops will be reset whenever SURNDR and BUSYOUT are both high. This condition occurs when flip-flop 364 has been set by flip-flop 354 and when BUSYOUT is indicating that arbiter 28 has the system bus. After the bus request flip-flops have been set, BUSYOUT will go low indicating the arbiter's surrender of the bus. This in turn will inhibit NAND gate 396 and allow the bus request flip-flops to be set by the next occurring bus request signal, BRQSET.

Although the present invention has been described in connection with the specified embodiment, it must be understood that the embodiment illustrated is only for the purposes of example and is not intended to either limit or restrict the scope of the claims. A number of configurations in which arbiter 28 and bus controller 52 can be used according to the present invention is larger than shown in FIGS. 1, 2 and 3 and may be combined with other integrated circuit chips in various levels and degrees of organization with a plurality of system busses having a heirarchy and plurality of input/output and resident busses. Many modifications and alterations may be made to the circuitry disclosed herein to effect such other system organizations without departing from the spirit and scope of the present invention.

I claim:

1. An arbitration circuit coupled to a system bus for arbitrating access and control of a system bus among a plurality of circuits for generating requests for command signals and transferring digital information, said circuits having an ordered priority of access to said system bus, said arbitration circuit having an assigned priority to said system bus together with at least one circuit for transferring digital information from and to said system bus, said one circuit having at least one mode of operation and at least one status of operation within said mode comprising:

first means for detecting the status and mode of operation of said one circuit;

second means for requesting and obtaining control of said system bus in response to said mode and status detected by said first means, said first and second means being coupled, said second means being coupled to said system bus; and third means, coupled to said first and second means, and to said system bus for selectively surrendering control of said system bus on both lower and higher priorities than said assigned priority of said one circuit, said surrendering including entry of said one circuit into an idle status in the presence of a lower priority request from another circuit, and entry of said one circuit into a non-accessing status with respect to said system bus in the presence of a lower priority request from another circuit;

whereby said system bus may be intelligently utilized to maximum efficiency by allowing a lower priority circuit access to said system bus without altering said assigned priority.

2. The circuit of claim 1 further comprising:

enabling means, coupled to said second and third means, for generating a single enabling signal (AEN) indicative of system bus access and surrender; and bus controller means, coupled to said enabling means, for generating a plurality of system bus command signals in response to said single enabling signal (AEN) wherein said plurality of system bus command signals are generated and coupled to said system bus by said bus controller means after a predetermined time allowing for set-up of said system bus command signals.

3. The circuit of claim 2 wherein said third means for selectively surrendering control of said system bus, holds said plurality of system bus command signals for a predetermined hold time by selectively causing said single enabling control signal (AEN) to go inactive after said predetermined hold time.

4. The circuit of claim 1 wherein said third means for selectively surrender control of said system bus includes lock/lplock means for preventing said third means from surrendering control of said system bus in response to a lock signal provided as an input to said lock/lplock means.

5. The circuit of claim 4 wherein said lock/lplock means prevents said third means from surrendering control of said system bus to lower priority system bus users in response to a lplock signal provided as an input to said lock/lplock means.

6. The circuit of claim 1 wherein said one circuit has a plurality of internal timing signals, and further comprising:

a first front end timing means for generating a first plurality of timing signals indicative of a first plurality of internal timing signals of said one circuit, said first plurality of internal timing signals being used to generate command signals from said one circuit; and a first back end timing means for generating a second plurality of timing signals indicative of a second plurality of internal timing signals of said one circuit, said second plurality of internal timing signals relating to terminating command signals from said one circuit, whereby a time duration made up of a plurality of wait and idle states may arise between setting up and terminating commands without the use of complex conditional logic circuitry.

7. The circuit of claim 2 wherein said one circuit has a plurality of internal timing signals and wherein said bus controller means further comprises:

a second front end timing means for generating a third plurality of timing signals indicative of a third plurality of internal timing signals of said one circuit, said third plurality of internal timing signals being used to generate command signals from said one circuit; and a second back end timing means for generating a fourth plurality of timing signals indicative of a fourth plurality of internal timing signals of said one other circuit, said fourth plurality of internal timing signals relating to terminating command signals from said one other circuit, whereby a time duration made up of a plurality of wait and idle states may arise between setting up and terminating commands without the use of complex conditional logic circuitry.

8. The circuit of claim 6 wherein said one circuit for transfering digital information has a local bus clock and wherein said third means includes:

a bus request reset decoder to decode a plurality of external system bus input signals and internal control signals indicative of the status of said second means for requesting and obtaining control of said system bus, said bus request reset decoder generating a plurality of bus request reset signals, each indicative of a bus surrender condition;

sample memory means for storing any active signal of said plurality of bus request reset signals, said sample memory means being coupled to said bus request reset decoder, said sample memory means generating a reset signal; and resolve means for selectively synchronizing said reset signal to said local bus clock, and transmitting said reset signal to said second means.

9. The circuit of claim 2 wherein each of said system bus command signals is generated by a decoder, first control circuit and second control circuit, said first control circuit for generating each said system bus command signal, said second control circuit for terminating each said system bus command signal, and said decoder for decoding a request from said one circuit for a selected one of said command signals, said first control circuit including a fast logic gate for selectively transmitting a decoded request to said second control circuit and including memory means for storing said decoded request signal, said second control circuit including a tristated gate for selectively transmitting said decoded request signal from said first control circuit to said system bus, said tristated gate being selectively controlled in response to said single enabling signal (AEN).

10. A circuit for arbitrating control of a system bus among a plurality of bus masters having a plurality of status and modes of operation, said plurality of bus masters having an ordered assignment of priority of access to said system bus and means for requesting access thereto, at least one of said plurality of bus masters corresponding to said circuit and having access to said system bus according to control by said circuit, each said bus master having said circuit, said circuit comprising:

status and mode decode circuit means for detecting the status and mode of operation of said corresponding bus master;

bus request and control circuit means for requesting, synchronizing, interfacing, and obtaining access and control of said system bus in response to a request therefor from said corresponding bus master, said bus request and control circuit means being coupled to said status and mode decode circuit means and to said system bus;

bus reset and surrender circuit means for selectively surrendering access and control of said system bus to both lower and higher priority bus masters than said corresponding bus master, said lower priority bus masters obtaining temporary access and control of said system bus when said corresponding bus master is not accessing said system bus, control of said system bus being selectively returned to said corresponding bus master from said lower priority bus masters when said corresponding bus master requests access to said system bus, said bus reset and surrender circuit means being coupled to said status and mode decode circuit means and to said bus request and control circuit means, whereby arbitration of said system bus among said plurality of bus masters is intelligently and efficiently effected by allowing lower priority bus masters access to and control of said system bus when said corresponding bus master, then having control, does not require access thereto.

11. The circuit of claim 10 furthering comprising: front end timing circuit means for generating a first plurality of timing signals signifying that a command from said corresponding bus master is to be generated, said front end timing circuit means having a plurality of status signals from said corresponding bus master as inputs; and back end timing circuit means for generating a second plurality of timing signals signifying that said command from said corresponding master is to be terminated independently of said front end timing circuit means, said back end timing circuit means having said plurality of status signals from said associated bus master as inputs, said front and back end timing circuit means being coupled to said status and mode decode circuit means, to said bus request and control circuit means, and to said bus reset and surrender circuit means, whereby, after command set-up, as timed by said front end timing circuit means, said corresponding bus master may enter a wait state and later exit the wait state and terminate command without the need for complex conditional logic to provide for wait state operation, and whereby after command termination, as timed by said back end timing circuit means, said associated bus master may enter an idle state and later exit the idle state and initiate command without the need for complex conditional logic to provide for idle state operation.

12. The circuit of claim 10 wherein said bus reset and surrender circuit means includes a bus controller interface circuit means for generating a single enabling signal (AEN) defining a predetermined hold time with respect to operation of said corresponding bus master, said single enabling signal signifying authorization to couple and terminate a command to said system bus.

13. The circuit of claim 12 further comprising a bus controller circuit means for selectively decoding and coupling a command to said system bus from said corresponding bus master in response to said single enabling signal (AEN), said bus controller circuit means including a bus interface and setup circuit means for coupling at least said single enabling signal (AEN) to said bus controller circuit means, said bus interface and setup circuit means defining a predetermined setup time with respect to operation of said corresponding bus master.

14. The circuit of claim 13 wherein said bus controller means includes:

front end timing bus circuit means for generating a third plurality of timing signals indicative of setup of a command from said corresponding bus master, said front end timing bus circuit means having a plurality of status signals from said corresponding bus master as inputs; and back end timing bus circuit means for generating a fourth plurality of timing signals indicative of termination of said command from said corresponding bus master independently of said front end timing bus circuit means, said back end timing bus circuit means having a plurality of status signals from said corresponding bus master as inputs, whereby after command setup, as timed by said front end timing bus circuit means, said corresponding bus master may enter a wait state and later exit therefrom and terminate command without the need for complex conditional timing logic to account for said wait state as a special case.

15. A method for arbitrating use of a system bus having a plurality of circuits for transferring digital information to and from said system bus coupled thereto, said plurality of circuits having an assignment of ordered priority of access and control to said system bus, each said circuit having at least one mode of operation and at least one status of operation within said mode, comprising the steps of:

detecting the status and mode of operation of a first one of said circuits;

defining selected access and surrender parameters in response to said detected status and mode operation;

requesting and obtaining access and control of said system bus according to said selected access and surrender parameters; and selectively surrendering control of said system bus to a second one of said plurality of circuits, the remaining plurality of circuits including said second one circuit having both higher and lower priority assignments than that assigned to said first one of said plurality of circuits, said system bus being selectively surrendered to a lower priority circuit while said first one of said plurality of circuits, having a higher priority, maintains its priority assignment thereover, said first one circuit surrendering control of said system bus when said first one circuit is not accessing said system bus, whereby said system bus may be intelligently utilized to maximum efficiency by allowing a lower priority circuit access to said system bus without necessarily altering said assignment of priorities among said plurality of circuits.

16. The method of claim 15 wherein said steps of requesting and obtaining access and control of said system bus, and selectively surrendering control of said system bus is effected by a bus arbiter means for selectively generating a single enabling signal (AEN) when access and control is permitted to said first one circuit, said bus arbiter means being coupled to said first one circuit, and is effected by a bus controller means for slectively generating a plurality of system bus command signals in response to said single enabling signal (AEN).

17. The method of claim 16 wherein said bus arbiter means selectively generates said single enabling signal in relation to operation of said first one circuit to provide for a predetermined hold time of commands from said first one circuit, and wherein said bus controller means responds to said single enabling signal in relation to operation of said first one circuit to provide for a predetermined setup time of commands from said first one circuit.

18. The method of claim 16 wherein said bus arbiter means and bus controller means each include:
- a front end timing circuit means for generating a first plurality of timing signals indicative of setup of a command from said first one circuit; and
- a back end timing circuit means for generating a second plurality of timing signals indicative of termination of said command from said first one circuit independently of said front end timing circuit means.

19. A method for arbitrating access and control of a system bus among a plurality of bus masters having an assigned priority of access to and control over said system bus, said assignment being made by a priority circuit, each said bus master having at least one mode of operation and at least one status of operation within said mode, comprising the steps of:
- detecting the status and mode of operation of one of said bus masters by a bus arbiter circuit means;
- requesting and obtaining access and control over said system bus by having said bus arbiter circuit means sampling the status of said system bus and responding to a bus-priority-in signal (BPRN) from said priority circuit;
- said one bus master obtaining control and access to said system bus when said bus arbiter circuit means senses a BUSY signal from said system bus as being inactive indicating system bus availability, said arbiter circuit means generates an active BUSY signal and instructs a bus controller circuit means by an enabling signal (AEN) to transmit a selected command to said system bus from said one bus master;
- selectively and temporarily surrendering control of said system bus by having said bus arbiter circuit means sampling the status of said system bus to detect a lower priority bus master requesting access and control of said system bus, and to instruct said priority circuit that priority of access and control to said system bus may be reassigned, and to instruct said bus controller circuit means to selectively surrender said system bus whenever said one bus master does not require access to said system bus; and
- re-requesting and selectively re-obtaining access and control to said system bus from said lower priority bus master by said bus arbiter and bus controller circuit means when said one bus master requires access to and control of said system bus;
- whereby, said system bus can be efficiently shared among higher and lower priority bus masters thereby permitting lower priority bus masters access and control to said system bus whenever possible without disrupting the assigned priority among said plurality of bus masters.

20. The method of claim 19 wherein said bus arbiter circuit means instructs said bus controller circuit means by a single enabling signal (AEN), wherein said bus arbiter circuit means provides for a predetermined hold time by holding said single enabling signal active for said predetermined hold time, and wherein said bus controller circuit means provides for a predetermined setup time by transmitting a selected command to said system bus at a time after said single enabling signal becomes active equal to said predetermined setup time.

21. The method of claim 19 wherein said bus arbiter and bus controller circuit means each include independent front and back end timing means, said front end timing means for generating a plurality of signals indicative of command setup, and said back end timing means for generating a plurality of signals indicative of command termination.

* * * * *